United States Patent
Iwata et al.

(10) Patent No.: US 11,978,877 B2
(45) Date of Patent: May 7, 2024

(54) METAL-AIR BATTERY AND PRODUCTION METHOD FOR AIR ELECTRODE

(71) Applicant: Nippon Telegraph and Telephone Corporation, Tokyo (JP)

(72) Inventors: Mikayo Iwata, Musashino (JP); Masaya Nohara, Musashino (JP); Hironobu Minowa, Musashino (JP); Shuhei Sakamoto, Musashino (JP); Takeshi Komatsu, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 231 days.

(21) Appl. No.: 17/312,569

(22) PCT Filed: Dec. 11, 2019

(86) PCT No.: PCT/JP2019/048540
§ 371 (c)(1),
(2) Date: Jun. 10, 2021

(87) PCT Pub. No.: WO2020/137557
PCT Pub. Date: Jul. 2, 2020

(65) Prior Publication Data
US 2022/0059888 A1    Feb. 24, 2022

(30) Foreign Application Priority Data
Dec. 25, 2018  (JP) ................................. 2018-240941

(51) Int. Cl.
*H01M 12/06* (2006.01)
*H01M 4/90* (2006.01)
*H01M 4/88* (2006.01)

(52) U.S. Cl.
CPC ......... *H01M 12/06* (2013.01); *H01M 4/9025* (2013.01); *H01M 4/9041* (2013.01); *H01M 4/8882* (2013.01); *H01M 2300/0085* (2013.01)

(58) Field of Classification Search
CPC ......... H01M 12/06; H01M 2004/8689; H01M 2300/0085; H01M 4/133; H01M 4/8882;
(Continued)

(56) References Cited

U.S. PATENT DOCUMENTS

2019/0348730 A1* 11/2019 Furutani ............... H01M 12/06

FOREIGN PATENT DOCUMENTS

JP            2017117524 A  *  6/2017  .............. H01M 4/86

OTHER PUBLICATIONS

Machine translation JP2017117524A (Year: 2017).*
(Continued)

*Primary Examiner* — Victoria H Lynch
(74) *Attorney, Agent, or Firm* — Workman Nydegger

(57) ABSTRACT

A battery performance of a metal-air battery is improved while still maintaining a low environmental burden. A metal-air battery includes an air electrode formed from a co-continuous substance having a three-dimensional network structure in which a plurality of nanostructures are integrated by noncovalent bonds; an anode; and an electrolyte disposed between the air electrode and the anode, in which the electrolyte is a gel electrolyte obtained by gelling an aqueous solution containing an ion conductor with a gelling agent, and the gelling agent is constituted of at least one of a plant-derived polysaccharide, a seaweed-derived polysaccharide, a microbial polysaccharide, an animal-derived polysaccharide, and a group of acetic acid bacteria that produce the polysaccharides.

20 Claims, 11 Drawing Sheets

(58) Field of Classification Search
CPC ............. H01M 4/9016; H01M 4/9025; H01M 4/9041; H01M 4/9083; Y02E 60/10
See application file for complete search history.

(56) References Cited

OTHER PUBLICATIONS

The Furukawa Battery Co., Ltd., *The Emergency Magnesium-Air Battery "MgBOX Series" is Now Compliant with the Green Purchasing Law*, literature, Feb. 15, 2017, https://corp.furukawadenchi.co.jp/ja/news/news-4202993417749662430.html, pp. 1.

* cited by examiner

METAL-AIR BATTERY AND PRODUCTION METHOD FOR AIR ELECTRODE

TECHNICAL FIELD

The present invention relates to a metal-air battery, and a method for manufacturing an air electrode of a metal-air battery.

BACKGROUND ART

Conventionally, alkaline batteries, manganese batteries, and the like have been widely used as disposable primary batteries. In addition, the development of distributed sensors that can be installed and used anywhere in the natural world such as in soils and forests has progressed in recent years along with the development of the Internet of Things (IoT), and small-sized and high-performance coin type lithium primary batteries corresponding to various usage applications such as these sensors are in widespread use.

However, there is a problem of resource depletion because disposable batteries generally used at present are constituted of rare metal metals such as lithium, nickel, manganese, and cobalt in many cases. Furthermore, there is a problem of difficulty in final disposal because a strong alkali such as an aqueous solution of potassium hydroxide, or an organic electrolyte solution is used as an electrolyte solution. In addition, there is a concern that the surrounding environment may be affected depending on environments in which these disposable batteries are used, such as a case where they are used as a driving source for a sensor to be embedded in soil.

In order to solve the above-mentioned problems, air batteries can be mentioned as a candidate for batteries incurring a low environmental burden. Because air batteries use oxygen and water as cathode active materials, and use metals such as magnesium, aluminum, calcium, iron, and zinc for an anode, their impact on soil pollution and impact on ecological systems are low. In addition, these are abundant materials in terms of resources and are inexpensive compared to rare metals. Such metal-air batteries are being researched and developed as batteries incurring a low environmental burden. For example, a magnesium-air battery is being sold as a power source for emergencies in which reduction in environmental burdens is taken into consideration (refer to NPL 1).

CITATION LIST

Non Patent Literature

[NPL 1] "Hijyouyou Magunesiumu Kuuki Denchi "MgBox Sereis" Ga Green Kounyuuhou Tekigouhinn Ni Narimasita (Magnesium Air Battery "MgBOX Series" for Emergencies has become an Eco-Friendly Product according to Act on Promoting Green Procurement)" by The Furukawa Battery Co., Ltd., [online], [found on Nov. 15, 2018], internet <URL: https://corp.furukawadenchi.co.jp/ja/news/news-4202993417749662430.html>

SUMMARY OF THE INVENTION

Technical Problem

However, oxygen is required as a cathode active material used in these air batteries. For this reason, there is a problem that a discharge capacity of only about 10% to 20% of a theoretical discharge capacity can be obtained in a state where a cathode is immersed in an electrolyte solution, because the cathode is gradually submerged, and oxygen cannot be supplied to the cathode.

The present invention has been made in view of the above-mentioned problems, and an object of the present invention is to improve a battery performance of a metal-air battery while still maintaining a low environmental burden.

Means for Solving the Problem

In order to achieve the above object, one aspect of the present invention is a metal-air battery including: an air electrode formed from a co-continuous substance having a three-dimensional network structure in which a plurality of nanostructures are integrated by noncovalent bonds; an anode; and an electrolyte disposed between the air electrode and the anode, in which the electrolyte is a gel electrolyte obtained by gelling an aqueous solution containing an ion conductor with a gelling agent, and the gelling agent is constituted of at least one of a plant-derived polysaccharide, a seaweed-derived polysaccharide, a microbial polysaccharide, an animal-derived polysaccharide, and a group of acetic acid bacteria that produce the polysaccharides.

In the metal-air battery, the ion conductor may be constituted of one or more of a chloride, an acetate, a carbonate, a citrate, a phosphate, 4-(2-hydroxyethyl)-1-piperazine ethanesulfonic acid (HEPES), a pyrophosphate, and a metaphosphate.

In the metal-air battery, the nanostructures of the air electrode may be a nanosheet constituted of at least one of carbon, iron oxide, manganese oxide, zinc oxide, molybdenum oxide, and molybdenum sulfide, or may be nanofibers constituted of at least one of carbon, iron oxide, manganese oxide, zinc oxide, molybdenum oxide, molybdenum sulfide, and cellulose.

In the metal-air battery, the anode may be constituted of one or more of magnesium, aluminum, calcium, iron, and zinc.

In the metal-air battery, the air electrode may support a catalyst constituted of at least one metal of iron, manganese, zinc, copper, or molybdenum, or an oxide of at least one metal of calcium, iron, manganese, zinc, copper, or molybdenum.

Another aspect of the present invention is a method for manufacturing an air electrode of the metal-air battery, the method including: a freezing step of freezing a sol or gel in which the nanostructures are dispersed to obtain a frozen substance; and a drying step of drying the frozen substance in a vacuum to obtain the co-continuous substance.

Still another aspect of the present invention is a method for manufacturing an air electrode of the metal-air battery, the method including: a gel production step of allowing bacteria to produce a gel in which nanofibers constituted of iron oxide or manganese oxide are dispersed; a freezing step of freezing the gel; and a drying step of drying the gel as a frozen substance.

Still another aspect of the present invention is a method for manufacturing an air electrode of the metal-air battery, the method including: a gel production step of allowing bacteria to produce a gel in which nanofibers constituted of cellulose are dispersed; a freezing step of freezing the gel; a drying step of drying the gel as a frozen substance; and a carbonization step of heating the co-continuous substance, which has been obtained by the drying, in a gaseous atmosphere in which cellulose does not combust to carbonize the co-continuous substance.

Effects of the Invention

According to the present invention, it is possible to improve a battery performance of a metal-air battery while still maintaining a low environmental burden.

DESCRIPTION OF EMBODIMENTS

Hereinafter, embodiments of the present invention will be described with reference to the drawings.

Figure 1:
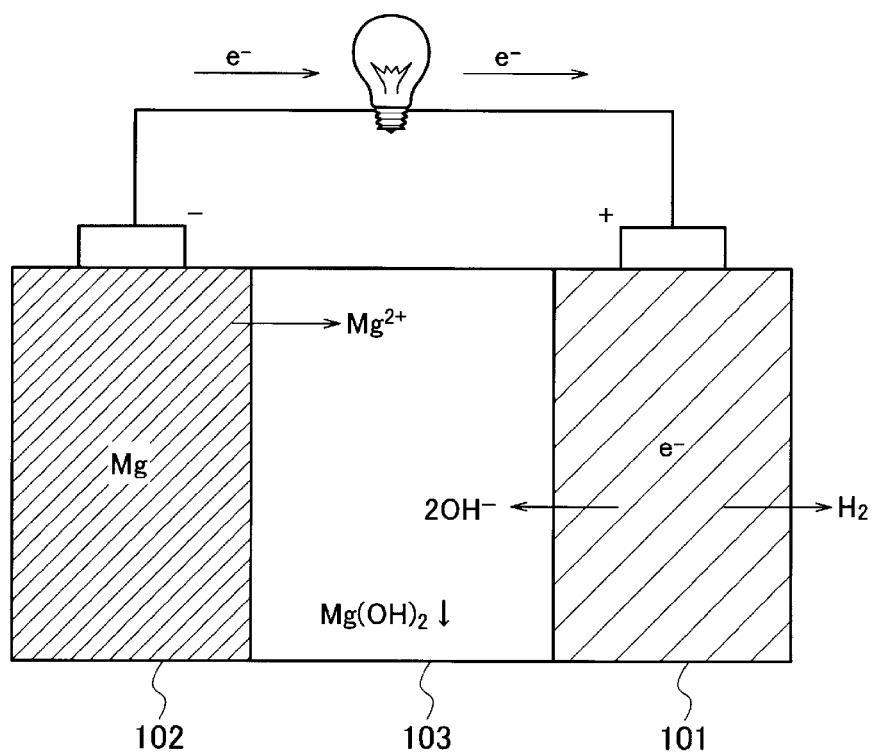
FIG. 1 is a configuration view showing a configuration of a metal-air battery in an embodiment of the present invention.

FIG. 1 is a configuration view showing a configuration of a metal-air battery in an embodiment of the present invention (hereinafter referred to as the "present embodiment"). In the metal-air battery of the present embodiment, air (oxygen) and water are used as a cathode active material, and a metal is used as an anode as in the case of generally well-known metal-air batteries. The metal-air battery shown in the drawing includes a gas diffusion type air electrode 101 which is a cathode, an anode 102, and an electrolyte 103 that is disposed to be sandwiched between the air electrode 101 and the anode 102. One surface of the air electrode 101 is exposed to the atmosphere, and the other surface thereof is in contact with the electrolyte 103. Furthermore, a surface of the anode 102 on an electrolyte 103 side is in contact with the electrolyte 103. The electrolyte 103 in the present embodiment is a gel electrolyte.

In the metal-air battery of the present embodiment, the air electrode 101 is formed from a co-continuous substance having a three-dimensional network structure in which a plurality of nanostructures are integrated by noncovalent bonds. The co-continuous substance is a porous body and has an integral structure. The nanostructures are a nanosheet or a nanofiber. The co-continuous substance, which has a three-dimensional network structure in which the plurality of nanostructures are integrated by noncovalent bonds, has a stretchable structure in which bonding parts between the nanostructures are deformable.

It is sufficient for the nanosheet to be constituted of at least one of, for example, carbon, iron oxide, manganese oxide, zinc oxide, magnesium oxide, molybdenum oxide, and a molybdenum sulfide compound. The molybdenum sulfide compound is, for example, molybdenum disulfide, phosphorus-doped molybdenum sulfide, or the like. It is sufficient for elements of these materials to be constituted of 16 essential elements indispensable for growth of plants (C, O, H, N, P, K, S, Ca, Mg, Fe, Mn, B, Zn, Cu, Mo, and Cl).

It is important that the nanosheet has conductivity. The nanosheet is defined as a sheet-like substance having a thickness of 1 nm to 1 μm and having a surface length and width 100 times or more the thickness. Examples thereof include graphene as nanosheets constituted of carbon. Furthermore, the nanosheet may have a rolled shape or a wavy shape, the nanosheet may be curved or bent, or the nanosheet may have any shape.

It is sufficient for the nanofiber to be constituted of at least one of, for example, carbon, iron oxide, manganese oxide, zinc oxide, magnesium oxide, molybdenum oxide, and molybdenum sulfide, and cellulose (carbonized cellulose). It is sufficient for elements of these materials to be constituted of 16 essential elements indispensable for growth of plants (C, O, H, N, P, K, S, Ca, Mg, Fe, Mn, B, Zn, Cu, Mo, and Cl).

It is important that the nanofiber has conductivity. The nanofiber is defined as a fibrous substance having a diameter of 1 nm to 1 μm and a length of 100 times or more the diameter. Furthermore, the nanofiber may have a hollow shape or a coiled shape, or the nanofiber may have any shape. As will be described later, the cellulose may be carbonized to be imparted with conductivity and then used.

For example, first, a sol or gel in which nanostructures are dispersed is frozen to form a frozen substance (freezing step), and the frozen substance is dried in a vacuum (drying step), and thereby it is possible to produce a co-continuous substance serving as the air electrode 101. It is possible to allow predetermined bacteria to produce any gel as long as it is a gel in which nanofibers constituted of any of iron oxide, manganese oxide, silicon, or cellulose are dispersed (gel production step).

Alternatively, the co-continuous substance may be obtained by allowing predetermined bacteria to produce a gel in which nanofibers constituted of cellulose are dispersed (gel production step), and heating this gel in an inert gas atmosphere to carbonize it (carbonization step).

An average pore size of the co-continuous substance constituting the air electrode 101 is preferably, for example, 0.1 to 50 μm, and is more preferably 0.1 to 2 μm. The average pore size referred to is a value obtained by a mercury intrusion method.

It is not necessary to use an additional material such as a binder for the air electrode 101 as in a case where a carbon powder is used, and this is advantageous in terms of costs and the environment.

An electrode reaction in the air electrode 101 and the anode 102 will be described. A case where magnesium is used for an anode will be described as an example of the reaction, but a reaction in which n electrons are lost occurs when an n-valent metal anode is used. Regarding an air electrode reaction, a reaction represented by "$\frac{1}{2}O_2 + H_2O + 2e^- \rightarrow 2OH^-$ . . . (1)" proceeds when oxygen in the air and an electrolyte come into contact with each other on a surface of the air electrode 101 having conductivity. On the other hand, regarding an anode reaction, a reaction represented by "Mg→Mg$^2$+2e$^-$ . . . (2)" proceeds in the anode 102 in contact with the electrolyte 103, and magnesium constituting the anode 102 loses electrons and dissolves as magnesium ions in the electrolyte 103.

Discharge can be performed by these reactions. The total reaction is "Mg+½O$_2$+H$_2$O+2e$^-$→Mg(OH)$_2$ . . . (3)," which is a reaction in which magnesium hydroxide is produced (precipitated). A theoretical electromotive force of a magnesium-air battery is 2.7 V. The compounds involved in the above reaction are shown together with the constituent elements of FIG. 1.

It is thought that it is better to generate a large amount of reaction sites inside the air electrode 101 since in this case the reaction represented by Formula (1) proceeds on the surface of the air electrode 101 in the metal-air battery as described above.

The air electrode 101 which is a cathode can be produced by a known process such as molding of a carbon powder with a binder. However, it is important that a large amount of reaction sites are generated inside the air electrode 101 in the metal-air battery as described above, and it is desirable that the air electrode 101 have a high specific surface area. For example, in the present embodiment, a specific surface area of the co-continuous substance constituting the air electrode 101 is preferably 200 m$^2$/g or more, and more preferably 300 m$^2$/g or more.

In a case of a conventional air electrode produced by molding a carbon powder with a binder and pelletizing it, a binding strength within the carbon powders decreases and the structure deteriorates when a specific surface area is enlarged. Thereby, it is difficult to perform discharge stably, and a discharge capacity decreases.

On the other hand, the above-mentioned conventional problem can be solved and a discharge capacity can be increased according to the air electrode 101 of the present embodiment which is formed from the above-described co-continuous substance having a three-dimensional network structure in which a plurality of nanostructures are integrated by noncovalent bonds.

Furthermore, the air electrode 101 may support a catalyst. The catalyst may be constituted of at least one metal of iron, manganese, zinc, copper, or molybdenum, or a metal oxide consisting of at least one metal of calcium, iron, manganese, zinc, copper, or molybdenum. It is sufficient for elements of these materials to be constituted of metals contained in 16 essential elements indispensable for growth of plants and to have a catalytic ability. As the metal, iron, manganese, and zinc are preferable, and an oxide consisting of one of these metals or a composite oxide consisting of two or more of these metals is preferable. Furthermore, manganese oxide (MnO$_2$) is particularly preferable. Manganese oxide is preferable because it exhibits a particularly excellent catalytic performance in examples to be described later.

In addition, a metal oxide used as a catalyst is preferably an amorphous metal oxide formed into a hydrate. For example, a metal oxide may be a hydrate of an oxide of the above-described transition metals. More specifically, a metal oxide may be a manganese(IV) oxide-n hydrate. Here, n is the number of moles of H$_2$O with respect to 1 mol of MnO$_2$. An excellent battery performance can be realized by supporting a manganese oxide hydrate as nano-sized fine particles in a highly dispersed manner on the surface of the co-continuous substance constituting the air electrode 101.

For example, it is possible to realize an excellent battery performance by using a co-continuous substance of the air electrode 101 on which a manganese oxide hydrate (MnO$_2$·nH$_2$O) is adhered (added) as nano-sized fine particles in a highly dispersed manner as the air electrode 101. A content of the catalyst in the air electrode 101 is 0.1% to 70% by weight and is preferably 1% to 30% by weight with respect to a total weight of the air electrode 101. A battery performance is greatly improved by adding a transition metal oxide as a catalyst to the air electrode 101. The air electrode 101 and the electrolyte 103 are in contact with each other, oxygen gas in the atmosphere is supplied at the same time, and thereby the above-described three-phase interface of electrolyte-electrode-gas (oxygen) is formed. When the catalyst has high activity at this three-phase interface site, oxygen reduction (discharge) on the electrode surface proceeds smoothly, and a battery performance is greatly improved. In this case, because the catalyst has a strong interaction with oxygen which is a cathode active material, a large amount of oxygen species can be adsorbed on its own surface, or oxygen species can be occluded in oxygen vacancies.

As described above, the oxygen species adsorbed on the surface of the metal oxide constituting the catalyst, or the oxygen species occluded in oxygen vacancies are used in an oxygen reduction reaction as an oxygen source (active intermediate reactant) of Formula (1), and thereby the above reaction is easily facilitated. As described above, a metal oxide such as manganese oxide effectively functions as a catalyst. In addition to such metal oxides, a metal itself can be used as a catalyst, and the metal functions in the same manner as the metal oxide.

As described above, it is desirable that more reaction sites [the above-mentioned three-phase site of electrolyte/electrode/air (oxygen)] which cause an electrode reaction be present in the metal-air battery in order to improve efficiency of the battery. From this viewpoint, it is important that a large number of the above-mentioned three-phase sites are present on the surface of the catalyst, and the catalyst preferably has a high specific surface area. A specific surface area of the catalyst constituted of metal or metal oxide may be 0.1 to 1,000 m$^2$/g, and it is preferably 1 to 500 m$^2$/g. The specific surface area is a specific surface area obtained by a known BET method using N$_2$ adsorption.

The air electrode 101 to which the catalyst is added can be manufactured by a method for manufacturing the air electrode 101 to be described later.

Further, the anode 102 will be described. The anode 102 is constituted of an anode active substance. This anode active material is not particularly limited as long as it is a material that can be used as an anode material for the metal-air battery, that is, any metal among magnesium, aluminum, calcium, iron, and zinc, or an alloy containing these metals as a main component. The anode 102 (anode active substance) may be constituted of one or more of magnesium, aluminum, calcium, iron, and zinc. For example, the anode 102 may be constituted of a metal serving as an anode, a metal sheet, an article obtained by crimping a powder on a foil of a metal such as copper, or the like.

The anode 102 can be formed by a known method. For example, when magnesium metal is used as the anode 102, the anode 102 can be produced by laminating a plurality of magnesium foil sheets and forming them into a predetermined shape.

Next, the electrolyte 103 will be described. It is sufficient for the electrolyte 103 to be a gel electrolyte containing an ion conductor capable of transferring hydroxide ions between the air electrode 101 (cathode) and the anode 102. It is sufficient for a gelling agent to be contained in an aqueous solution in which the ion conductor is dissolved for gelling of the ion conductor. The gelling agent may be constituted of at least one of a plant-derived polysaccharide (for example, cornstarch, potato starch, tapioca starch, dextrin, tamarind seed gum, guar gum, locust bean gum, gum arabic, karaya gum, pectin, cellulose, konjac mannan, soybean polysaccharide, and the like), a seaweed-derived polysaccharide (for example, carrageenan, agar, alginic acid, and the like), a microbial polysaccharide (for example, xanthan gum, gellan gum, *Agrobacterium* succinoglycan, cellulose, and the like), and an animal-derived polysaccharide (for example, chitin, chitosan, gelatin, and the like).

In addition, the gelling agent may be constituted of at least one of a group of acetic acid bacteria (for example, *Acetobacter xylinum* subsp. *sucrofermentans, Acetobacter xylinum* ATCC23768, *Acetobacter xylinum* ATCC23769, *Acetobacter pasturianus* ATCC10245, *Acetobacter xylinum* ATCC14851, *Acetobacter xylinum* ATCC11142, *Acetobacter xylinum* ATCC10821, and the like) which produce the above-mentioned polysaccharides (plant-derived polysaccharides, seaweed-derived polysaccharides, microbial polysaccharides, and animal-derived polysaccharides). Furthermore, the gelling agent may be constituted of at least one of the above-mentioned polysaccharide and group of acetic acid bacteria.

A content of the gelling agent may be 0.01% to 90% by weight and is preferably 0.01% to 20% by weight with respect to a content of the electrolyte solution containing the ion conductor.

Examples of ion conductors used as the ion conductor constituting the electrolyte include metal salts containing potassium and sodium, which are abundant on the Earth. It is sufficient for these metal salts to be constituted of 16 essential elements indispensable for growth of plants (C, O, H, N, P, K, S, Ca, Mg, Fe, Mn, B, Zn, Cu, Mo, and Cl) and elements contained in seawater and rainwater.

It is sufficient for the ion conductor of the electrolyte 103 to be constituted of, for example, at least one or more of chlorides such as a sodium chloride and a potassium chloride, an acetate, a carbonate, a citrate, a phosphate, 4-(2-hydroxyethyl)-1-piperazine ethanesulfonic acid (HEPES), a pyrophosphate, and a metaphosphate. In addition, the ion conductor may be constituted of a mixture of these materials. Magnesium acetate is particularly preferable, because magnesium acetate is one of fertilizer components, and not only does it have no effects when an electrolyte leaks into the soil but also has functions as a soil conditioner.

The electrolyte 103 can be formed by adding the gelling agent in an aqueous solution obtained by dissolving the ion conductor in ion exchange water at a concentration of 0.1 to 10 mol/L, and preferably at a concentration of 0.1 to 2 mol/L.

In addition to the above configuration, the metal-air battery may include structural members such as a separator, a battery case, and a metal mesh (for example, a copper mesh), or elements required for a metal-air battery. Conventionally known members or elements can be used as these members or elements. It is not necessary to use a separator when a gel electrolyte is used because the gel electrolyte serves as a substitute for a separator, but a separator can also be used in combination with the gel electrolyte. When a separator is used in a case where a gel electrolyte is not sufficiently thick, an effect of preventing short-circuiting in the battery can be expected because a water content in the gel electrolyte is consumed and becomes smaller as a battery reaction progresses. The separator is not particularly limited as long as it is a fiber material, but a cellulosic separator made from plant fibers or bacteria is particularly preferable.

Manufacturing Method

Next, a method for manufacturing a metal-air battery will be described. The metal-air battery of the present embodiment can be produced by appropriately disposing the air electrode 101 which is obtained by a method for manufacturing an air electrode to be described later, the anode 102, and the electrolyte 103, in an appropriate container such as a case together with other necessary elements based on a structure of a desired metal-air battery. Conventionally known methods can be applied to manufacturing procedures of the metal-air battery. Hereinafter, a method for manufacturing the electrolyte 103 and a method for manufacturing the air electrode 101 will be described.

First, the method for manufacturing the electrolyte 103 will be described in a manufacturing method 1.

Manufacturing Method 1 (Method for Manufacturing Electrolyte)

Figure 2:
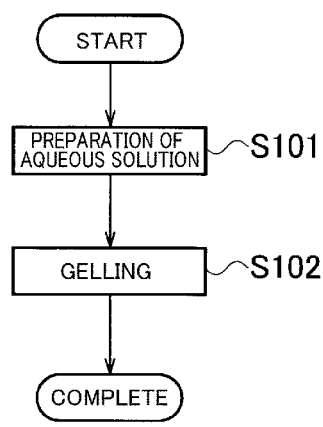
FIG. 2 is a flowchart for explaining a manufacturing method 1 in an embodiment of the present invention.

First, the manufacturing method 1 for manufacturing the electrolyte 103 will be described with reference to FIG. 2. FIG. 2 is a flowchart for explaining the manufacturing method 1. First, in step S101, an ion conductor of an electrolyte is dissolved in ion exchange water to prepare an aqueous solution. Next, in step S102, a gelling agent is added to the prepared aqueous solution. As the gelling agent, it is possible to use a plant-derived polysaccharide (such as cornstarch, potato starch, tapioca starch, dextrin, tamarind seed gum, guar gum, locust bean gum, gum arabic, karaya gum, pectin, cellulose, konjac mannan, and soybean polysaccharide); a seaweed-derived polysaccharide (such as carrageenan, agar, and alginic acid); a microbial polysaccharide (such as xanthan gum, gellan gum, *Agrobacterium* succinoglycan, and cellulose); an animal-derived polysaccharide (such as chitin, chitosan, and gelatin); a group of acetic acid bacteria which produce the above-mentioned polysaccharides (such as *Acetobacter xylinum* subsp. *sucrofermentans, Acetobacter xylinum* ATCC23768, *Acetobacter xylinum* ATCC23769, *Acetobacter pasturianus* ATCC10245, *Acetobacter xylinum* ATCC14851, *Acetobacter xylinum* ATCC11142, and *Acetobacter xylinum* ATCC10821); and the like.

A content of the gelling agent may be 0.01% to 90% by weight and is preferably 0.01% to 20% by weight with respect to a content the aqueous solution of the ion conductive body. The ion conductor is constituted of one or more of a chloride, an acetate, a carbonate, a citrate, a phosphate, 4-(2-hydroxyethyl)-1-piperazine ethanesulfonic acid (HEPES), a pyrophosphate, and a metaphosphate.

When the gelling agent is added to a solvent at about 50° C. to 90° C., the molecules disperse sufficiently and the gelling agent becomes sufficiently swollen. As the temperature of the solvent decreases, the molecules become entangled with each other and form cross-linking points. When a number of these cross-linking points are formed, the gelling agent forms a network-like structure, and thereby the solvent becomes a gel. A melting temperature (50° C. to 90° C.) required to dissolve the gelling agent and a cooling temperature (10° C. to 80° C.) required for gelling change depending on gelling agents used.

Hereinafter, the method for manufacturing the air electrode 101 will be described with reference to manufacturing methods 2 and 3.

Manufacturing Method 2 (Method for Manufacturing Air Electrode)

Figure 3:
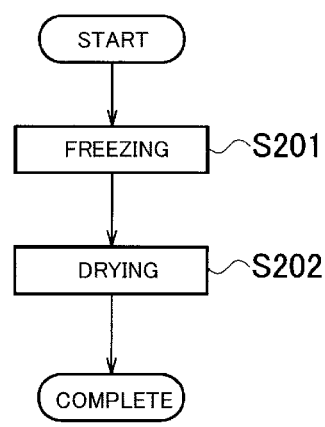
FIG. 3 is a flowchart for explaining a manufacturing method 2 in an embodiment of the present invention.

Next, the manufacturing method 2 will be described with reference to FIG. 3. FIG. 3 is a flowchart for explaining the manufacturing method 2. First, in step S201, a sol or gel in which nanostructures such as nanosheets or nanofibers are dispersed is frozen to obtain a frozen substance (freezing step). Next, in step S202, the obtained frozen substance is dried in vacuum to obtain a co-continuous substance (drying step).

Hereinafter, each of the steps will be described in more detail. The freezing step which is step S201 is a step of maintaining or constructing a three-dimensional network structure by using nanostructures serving as a raw material for a stretchable co-continuous substance having the three-dimensional network structure consisting of a plurality of nanostructures integrated by noncovalent bonds.

The term gel means a gel that has lost fluidity and reached a solid state due to a three-dimensional network structure of nanostructures in which a dispersion medium is a dispersoid. Specifically, it means a disperse system in which a shear modulus is $10^2$ to $10^6$ Pa. The dispersion medium of the gel is of an aqueous type such as water ($H_2O$) or, an organic type such as a carboxylic acid, methanol ($CH_3OH$), ethanol ($C_2H_5OH$), propanol ($C_3H_7OH$), n-butanol, isobutanol, n-butylamine, dodecane, unsaturated fatty acids, ethylene glycol, heptane, hexadecane, isoamyl alcohol, octanol, isopropanol, acetone, and glycerin. In addition, two or more kinds of these materials may be mixed.

Further, the term sol means a colloid consisting of nanostructures that are a dispersion medium and a dispersoid. Specifically, it means a disperse system in which a shear modulus is 1 Pa or less. The dispersion medium of the sol is an aqueous type such as water or, an organic type such as a carboxylic acid, methanol, ethanol, propanol, n-butanol, isobutanol, n-butylamine, dodecane, unsaturated fatty acids, ethylene glycol, heptane, hexadecane, isoamyl alcohol, octanol, isopropanol, acetone, and glycerin. In addition, two or more kinds of these materials may be mixed.

The freezing step is performed such that, for example, a sol or gel in which nanostructures are dispersed is accommodated in an appropriate container such as a test tube, and the surroundings of the test tube are cooled in a cooling material such as liquid nitrogen to freeze the sol or gel accommodated in the test tube. A freezing method is not particularly limited as long as the dispersion medium of the gel or sol can be cooled below a solidification point, and cooling may be performed in a freezer or the like.

The dispersion medium loses fluidity and the dispersoid is fixed by freezing the gel or sol, and thereby a three-dimensional network structure is constructed. Furthermore, in the freezing step, a specific surface area can be freely adjusted by adjusting a concentration of the gel or sol, and as a concentration of the gel or sol becomes smaller, a specific surface area of a co-continuous substance to be obtained becomes larger. However, when a concentration is 0.01% by weight or less, it becomes difficult for a three-dimensional network structure to be constructed with the dispersoid. Accordingly, it is suitable that a concentration of the dispersoid be 0.01% to 10% by weight or less.

By constructing a three-dimensional network structure having a high specific surface area with nanostructures such as nanofibers or nanosheets, the structure has excellent stretchability as a result of pores playing a role as cushions during compression or tension. Specifically, a strain at an elastic limit of the co-continuous substance is desirably 5% or more, and is more desirably 10% or more.

Because the dispersoid agglomerates as the dispersion medium evaporates in the subsequent drying step in a case where the dispersoid is not fixed by freezing, a sufficiently high specific surface area cannot be obtained, and thereby it becomes difficult to produce a co-continuous substance having a three-dimensional network structure.

Next, the drying step of step S202 will be described. The drying step is a step of taking out the dispersoid (a plurality of integrated fine structures) in which a three-dimensional network structure is maintained or constructed from the dispersion medium in the frozen substance obtained in the freezing step.

In the drying step, the frozen substance obtained in the freezing step is dried in vacuum, and the frozen dispersion medium sublimates from a solid state. For example, sublimation is performed by accommodating the obtained frozen substance in an appropriate container such as a flask, and evacuating the inside of the container. A sublimation point of the dispersion medium is lowered by disposing the frozen substance in a vacuum atmosphere, and thereby sublimation of even a substance that does not sublimate under normal pressure becomes possible.

A degree of vacuum in the drying step varies depending on dispersion media used, but it is not particularly limited as long as it is a degree of vacuum at which the dispersion medium sublimates. For example, it is necessary to set a pressure to a degree of vacuum of 0.06 MPa or less when water is used as the dispersion medium, but drying takes time because heat is taken away as latent heat of sublimation. For this reason, a degree of vacuum is suitably $1.0 \times 10^{-6}$ to $1.0 \times 10^{-2}$ Pa. Furthermore, heat may be applied using a heater or the like at the time of drying.

In a method of drying in the air, a dispersion medium changes from a solid to a liquid, and thereafter it changes from a liquid to a gas. Thereby, a frozen substance reaches a liquid state and becomes a fluid again in the dispersion medium, and therefore a three-dimensional network structure of a plurality of nanostructures collapses. For this reason, it is difficult to produce a co-continuous substance having stretchability by drying in an atmospheric pressure atmosphere.

Manufacturing Method 3 (Method for Manufacturing Air Electrode)

Figure 4:
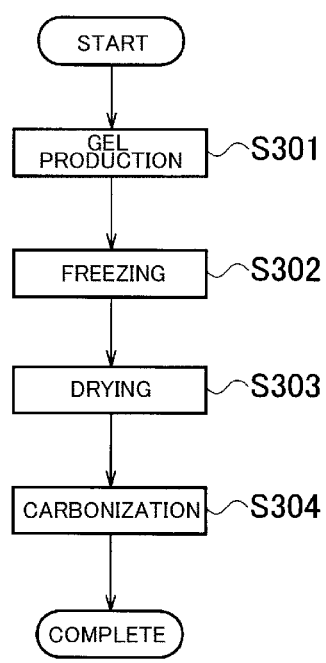
FIG. 4 is a flowchart for explaining a manufacturing method 3 in an embodiment of the present invention.

Next, the manufacturing method 3 for manufacturing the air electrode 101 using a gel produced by bacteria will be described with reference to FIG. 4. FIG. 4 is a flowchart for explaining the manufacturing method 3.

First, in step S301, predetermined bacteria are allowed to produce a gel in which nanofibers constituted of any of iron oxide, manganese oxide, or cellulose are dispersed (gel production step). A co-continuous substance is produced using the gel thus obtained.

The gel produced by bacteria has a basic structure of fibers on the nm order, and by producing a co-continuous substance using this gel, the co-continuous substance thus obtained has a high specific surface area. Since it is desirable that the air electrode of the metal-air battery have a high specific surface area as mentioned above, using the gel produced by bacteria is suitable. Specifically, it is possible to synthesize an air electrode (co-continuous substance) having a specific surface area of 300 $m^2/g$ or more by using the gel produced by bacteria.

The gel produced by bacteria has a structure in which fibers are entangled in a coil shape or network-like shape, and has a structure in which nanofibers branch based on growth of bacteria. Therefore, in a co-continuous substance that can be produced, excellent stretchability with a strain at an elastic limit of 50% or more is realized. Accordingly, a co-continuous substance produced using the gel produced by bacteria is suitable for the air electrode of the metal-air battery.

For the gel produced by bacteria, two or more kinds of bacterial cellulose, iron oxide, and manganese oxide may be mixed.

As the bacteria, known bacteria are exemplified. Examples thereof include acetic acid bacteria such as *Acetobacter xylinum* subsp. *sucrofermentans, Acetobacter xylinum* ATCC23768, *Acetobacter xylinum* ATCC23769, *Acetobacter pasturianus* ATCC10245, *Acetobacter xylinum* ATCC14851, *Acetobacter xylinum* ATCC11142, and *Acetobacter xylinum* ATCC10821; and the genus *Agrobacterium*, the genus *Rhizobium*, the genus *Sarcina*, the genus *Pseudomonas*, the genus *Achromobacter*, the genus *Alcaligenes*, the genus *Aerobacter*, the genus *Azotobacter*, the genus *Zoogloea*, the genus *Enterobacter*, the genus *Crubella*, the genus *Leptothrix*, the genus *Gallionella*, the genus *Siderocapsa*, the genus *Thiobacillus*, and bacteria produced by culturing various mutant strains created by subjecting the above bacteria to a mutation treatment by a known method in which nitrosoguanidine (NTG) or the like is used.

As a method of obtaining a co-continuous substance using the gel produced by the above-mentioned bacteria, the gel is frozen to obtain a frozen substance in step S302 (freezing step), and the frozen substance is dried in a vacuum to obtain a co-continuous substance in step S303 (drying step), as in the manufacturing method 2. However, in a case of using a gel in which nanofibers constituted of cellulose produced by bacteria are dispersed, a co-continuous substance to be produced is heated in a gaseous atmosphere in which cellulose does not combust to carbonize the co-continuous substance in step S304 (carbonization step).

Because bacterial cellulose, which is a component contained in the gel produced by bacteria, does not have conductivity, the carbonization step of carbonizing the bacterial cellulose by a heat treatment in an inert gas atmosphere to impart conductivity thereto is important when the bacterial cellulose is used as an air electrode. The co-continuous substance carbonized in this manner has high conductivity, corrosion resistance, high stretchability, and a large specific surface area, and thus it is suitable as the air electrode of the metal-air battery.

Regarding carbonization of the bacterial cellulose, it is sufficient for the bacterial cellulose to be carbonized by firing at 500° C. to 2,000° C., and more preferably at 900° C. to 1,800° C. in an inert gas atmosphere after synthesizing a co-continuous substance having a three-dimensional network structure consisting of the bacterial cellulose by the above-mentioned freezing step and drying step. A gas in which cellulose does not combust may be, for example, an inert gas such as a nitrogen gas and an argon gas. Furthermore, the gas may be a reducing gas such as hydrogen gas and carbon monoxide gas, or may be carbon dioxide gas. In the present embodiment, the gas is more preferably carbon dioxide gas or carbon monoxide gas, which has an activating effect on a carbon material and in which high activation of a co-continuous substance can be expected.

Hereinafter, a method of causing the air electrode 101 to support a catalyst will be described in manufacturing methods 4 to 7.

Manufacturing Method 4 (Method of Causing Air Electrode to Support Catalyst)

Figure 5:
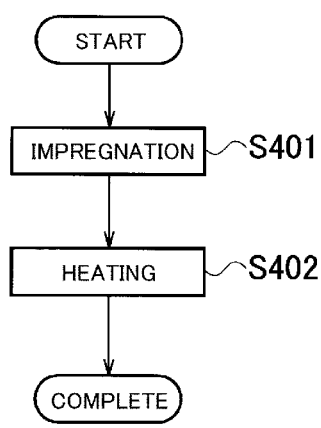
FIG. 5 is a flowchart for explaining a manufacturing method 4 in an embodiment of the present invention.

Next, the manufacturing method 4 will be described with reference to FIG. 5. FIG. 5 is a flowchart for explaining the manufacturing method 4. As described above, an air electrode may be caused to support a catalyst. In step S401, the co-continuous substance obtained in the above-mentioned manufacturing method 2 or manufacturing method 3 is impregnated with an aqueous solution of metal salts serving as a precursor of a catalyst (impregnation step). It is sufficient for the stretchable co-continuous substance containing metal salts to be heat-treated in step S402 (heating step) after preparing the stretchable co-continuous substance containing metal salts in the above manner. A preferable metal of metal salts to be used is at least one metal selected from the group consisting of iron, manganese, zinc, copper, and molybdenum. Manganese is particularly preferable.

Conventionally known methods can be used to cause a co-continuous substance to support transition metal oxides. Examples thereof include a precipitation method in which a co-continuous substance is impregnated with an aqueous solution of a transition metal chloride or a transition metal nitrate, and an alkaline aqueous solution is added dropwise thereto. Examples thereof further include a sol-gel method in which a co-continuous substance is impregnated with a solution of a transition metal alkoxide and hydrolyzed. The conditions for each of these methods using a liquid phase method are known, and these known conditions can be applied. In the present embodiment, a liquid phase method is desirable.

In many cases, metal oxides supported by the above liquid phase method are in an amorphous state in many cases because crystallization has not progressed. Crystalline metal oxides can be obtained by heat-treating an amorphous precursor in an inert atmosphere at a high temperature of about 500° C. Such crystalline metal oxides exhibit high performance even when they are used as a catalyst for the air electrode.

Meanwhile, a precursor powder obtained when the above-mentioned amorphous precursor is dried at a relatively low temperature of about 100° C. to 200° C. is in a hydrated state while still maintaining an amorphous state. A hydrate of metal oxides can be formally represented by $MexOy \cdot nH_2O$ (where Me means the above metals, x and y respectively represent the number of metal atoms and oxygen contained in a metal oxide molecule, and n is the number of moles of $H_2O$ with respect to 1 mole of the metal oxide). The hydrates of metal oxides obtained by such drying at a low temperature can be used as a catalyst.

Amorphous metal oxides (hydrates) have a large surface area and a particle size of about 30 nm, which is a very small value, because sintering has hardly progressed. The amorphous metal oxides are suitable as a catalyst, and an excellent battery performance can be obtained by using them.

As described above, crystalline metal oxides show high activity, but in the above-described metal oxides crystallized by a heat treatment at a high temperature, a surface area may be significantly reduced, and a particle size may be about 100 nm due to particle aggregation. The particle size (average particle size) is a value obtained by magnifying and observing with a scanning electron microscope (SEM) or the like, measuring a diameter of particles per 10 μm square (10 μm×10 μm), and calculating an average value.

In addition, it may be difficult to add a catalyst to a surface of a co-continuous substance in a highly dispersed manner because particles aggregate in, particularly a catalyst made of metal oxides which has been heat-treated at a high temperature. It is required to add a large amount of metal oxides to the air electrode (co-continuous substance) in some cases in order to obtain a sufficient catalytic effect, and production of a catalyst by a heat treatment at a high temperature may be disadvantageous in terms of costs.

In order to solve this problem, the following manufacturing method 5, manufacturing method 6, or manufacturing method 7 may be used.

Manufacturing Method 5 (Method of Causing Air Electrode to Support Catalyst)

Figure 6:
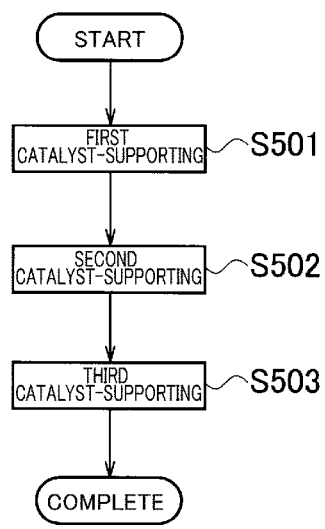
FIG. 6 is a flowchart for explaining manufacturing methods 5, 6, and 7 in embodiments of the present invention.

Next, the manufacturing method 5 will be described with reference to FIG. 6. FIG. 6 is a flowchart for explaining the manufacturing methods 5, 6, and 7.

In the manufacturing method 5, the co-continuous substance produced in the manufacturing method 2 or 3 supports a catalyst. In the manufacturing method 5, in addition to the above-mentioned manufacture of a co-continuous substance, the following catalyst-supporting step of causing a catalyst to be supported is added.

First, in a first catalyst-supporting step of step S501, a co-continuous substance is immersed in an aqueous solution of a surfactant to adhere the surfactant to a surface of the co-continuous substance.

Next, in a second catalyst-supporting step of step S502, using a surfactant, metal salts are adhered to the surface of the co-continuous substance to which the surfactant is adhered by using an aqueous solution of metal salts.

Next, in a third catalyst-supporting step which is step S503, via a heat treatment performed on a co-continuous substance to which metal salts have been adhered, the co-continuous substance is caused to support a catalyst consisting of metals or metal oxides from these metal salts.

The metal is at least one metal of iron, manganese, zinc, copper, or molybdenum, or a metal oxide consisting of at least one metal of calcium, iron, manganese, zinc, copper, or molybdenum. Manganese (Mn) or a manganese oxide ($MnO_2$) is particularly preferable.

The surfactant used in the first catalyst-supporting step of the manufacturing method 5 is for causing an air electrode (co-continuous substance) to support a metal or a transition metal oxide in a highly dispersed manner. In a case of a surfactant having a hydrophobic group adsorbed on a carbon surface and a hydrophilic group adsorbed by a transition metal ion in a molecule, a metal ion which is a transition metal oxide precursor can be adsorbed on a co-continuous substance in a high degree of dispersion.

The above-mentioned surfactant is not particularly limited as long as it has a hydrophobic group adsorbed on a carbon surface and a hydrophilic group adsorbed by a transition metal ion (for example, manganese ion) in the molecule, but a nonionic surfactant is preferable. Example of ester type surfactants include glycerin laurate, glycerin monostearate, sorbitan fatty acid esters, sucrose fatty acid esters, and the like. In addition, examples of ether type surfactants include polyoxyethylene alkyl ethers, polyoxyethylene alkyl phenyl ethers, polyoxyethylene polyoxypropylene glycols, and the like.

Examples of ester ether type surfactants include polyoxyethylene sorbitan fatty acid esters, polyoxyethylene hexitane fatty acid esters, sorbitan fatty acid ester polyethylene glycols, and the like. In addition, examples of alkanolamide type surfactants include laramide, cocamide DEA, and the like. In addition, examples of surfactants of higher alcohols include cetanol, stearyl alcohol, oleyl alcohol, and the like. In addition, examples of poloxamer type surfactants include poloxamer methacrylate and the like.

A concentration of the aqueous solution of the surfactant in the first catalyst-supporting step of the manufacturing method 5 is preferably 0.1 to 20 g/L. Furthermore, immersion conditions such as an immersion time and an immersion temperature include, for example, immersion in a solution at room temperature to 50° C. for 1 to 48 hours.

The second catalyst-supporting step of the manufacturing method 5 includes further dissolving of metal salts functioning as a catalyst in the aqueous solution containing the surfactant in the first catalyst-supporting step, or adding an aqueous solution of metal salts. Alternatively, an aqueous solution in which metal salts functioning as a catalyst are dissolved may be prepared separately from the above-mentioned aqueous solution containing the surfactant, and a co-continuous substance impregnated (attached) with the surfactant may be immersed therein.

Furthermore, the co-continuous substance to which the surfactant is adhered may be impregnated with the aqueous solution in which the metal salts are dissolved. If necessary, an alkaline aqueous solution may be added dropwise to the co-continuous substance containing (to which are attached) the obtained metal salts. Thereby, a metal or a metal oxide precursor can be adhered to the co-continuous substance.

An amount of the metal salts added in the second catalyst-supporting step of the manufacturing method 5 is preferably an amount of 0.1 to 100 mmol/L. Furthermore, immersion conditions such as an immersion time and an immersion temperature include, for example, immersion in a solution at room temperature to 50° C. for 1 to 48 hours.

More specifically, manganese as a metal will be described as an example. For example, manganese metal salts (for example, manganese halides such as manganese chloride or hydrates thereof) may be added to an aqueous solution which contains a surfactant and with which a co-continuous substance has been impregnated. Next, an alkaline aqueous solution is added dropwise onto the obtained co-continuous substance containing manganese metal salts, and thereby it is possible to cause the co-continuous substance to support manganese hydroxide as a metal or metal oxide precursor.

The amount of the above-described catalyst made of manganese oxide which is supported can be adjusted according to the concentrations of the metal salts (for example, manganese chloride) in an aqueous solution of the metal salts.

Examples of alkalis used in the above-mentioned alkaline aqueous solution include hydroxides of alkali metals and alkaline earth metals, aqueous ammonia, aqueous ammonium solutions, an aqueous solution of tetramethylammonium hydroxide (TMAH), and the like. A concentration of these alkaline aqueous solutions is preferably 0.1 to 10 mol/L.

In the third catalyst-supporting step in the manufacturing method 5, the metal or metal oxide precursor (metal salt) adhered to the surface of the co-continuous substance is converted into the metal itself or the metal oxide by a heat treatment.

Specifically, it is sufficient for the co-continuous substance to which the precursor is adhered to be dried at room temperature (about 25° C.) to 150° C., and more preferably at 50° C. to 100° C. for 1 to 24 hours, and then subjected to a heat treatment at 100° C. to 600° C., preferably 110° C. to 300° C.

In the third catalyst-supporting step in the manufacturing method 5, it is possible to manufacture an air electrode formed from a co-continuous substance having a surface to which a metal itself is adhered as a catalyst, by a heat treatment in an inert atmosphere such as argon, helium, or nitrogen or in a reducing atmosphere. Furthermore, it is possible to manufacture an air electrode formed from a co-continuous substance having a surface to which a metal oxide is adhered as a catalyst, by a heat treatment in a gas containing oxygen (oxidizing atmosphere).

In addition, the heat treatment may be performed under the above-mentioned reducing conditions to firstly prepare a co-continuous substance to which the metal itself is adhered as a catalyst, and next, by subjecting this co-continuous substance to a heat treatment in an oxidizing atmosphere, it is possible to manufacture an air electrode formed from the co-continuous substance to which a metal oxide is adhered as a catalyst.

As an alternative method, a co-continuous substance to which a metal or metal oxide precursor (metal salt) is adhered may be dried at room temperature to 150° C., and more preferably at 50° C. to 100° C., and the metal itself may be adhered on the co-continuous substance as a catalyst to form a composite of metal/co-continuous substance.

In the manufacturing method 5, an adhesion amount (content) of the catalyst made of a metal or metal oxide is 0.1% to 70% by weight and is preferably 1% to 30% by weight with respect to a total weight of the co-continuous substance and the catalyst.

According to the manufacturing method 5, it is possible to manufacture an air electrode in which a catalyst made of a metal or a metal oxide is highly dispersed on the surface of the co-continuous substance, and thereby it is possible to form a metal-air battery having excellent electrical characteristics.

Manufacturing Method 6 (Method of Causing Air Electrode to Support Catalyst)

Next, the manufacturing method 6 will be described. In the manufacturing method 6, the co-continuous substance produced as described in the manufacturing method 2 and the manufacturing method 3 is caused to support a catalyst by a method different from that of the manufacturing method 5 described above. In the manufacturing method 6, the following catalyst-supporting step of supporting a catalyst is added in addition to the above-mentioned manufacture of the co-continuous substance.

In a first catalyst-supporting step, a co-continuous substance is immersed in an aqueous solution of metal salts to adhere the metal salts to a surface of the co-continuous substance.

Next, in a second catalyst-supporting step, the co-continuous substance is caused to support a catalyst consisting of a metal constituting the metal salts by a heat treatment performed on the co-continuous substance to which the metal salts are adhered.

Next, in a third catalyst-supporting step, the catalyst is made into a hydrate of metal oxides by causing the co-continuous substance supporting the catalyst to act on water at high temperature and high pressure.

The metal is at least one metal of iron, manganese, zinc, copper, or molybdenum, or a metal oxide consisting of at least one metal of calcium, iron, manganese, zinc, copper, or molybdenum. Manganese (Mn) or a manganese oxide ($MnO_2$) is particularly preferable.

In the first catalyst-supporting step in the manufacturing method 6, an aqueous solution of a metal salt that serves as a precursor of a metal or metal oxide to be finally used as a catalyst is adhered to (supported by) a surface of the co-continuous substance. For example, it is sufficient for an aqueous solution in which the above metal salt is dissolved to be prepared separately so that a co-continuous substance is impregnated with this aqueous solution. Impregnation conditions and the like are the same as those in the related art described above.

The second catalyst-supporting step in the manufacturing method 6 is the same as the third catalyst-supporting step in the manufacturing method 5, and it is sufficient for a heat treatment to be supported out in an inert atmosphere or a reducing atmosphere. Furthermore, as described in the alternative method of the third catalyst-supporting step of the manufacturing method 5, a metal may be adhered to the co-continuous substance by heat-treating (drying) the co-continuous to which the precursor is adhered at a low temperature (room temperature to 150° C., more preferably 50° C. to 100° C.)

The air electrode 101 in which the metal itself is used as a catalyst exhibits high activity, but since the catalyst is a metal, it is vulnerable to corrosion and lacks long-term stability in some cases. On the other hand, long-term stability can be realized by heat-treating a metal to form hydrates of metal oxides by the third catalyst-supporting step of the manufacturing method 6 to be described in detail below.

In the third catalyst-supporting step of the manufacturing method 6, the hydrates of metal oxides are in a state of being adhered to the co-continuous substance. Specifically, the co-continuous substance to which a metal is adhered and which is obtained in the second catalyst-supporting step of the manufacturing method 6 is immersed in high-temperature and high-pressure water, and the adhered metal is converted into a catalyst consisting of hydrates of metal oxides.

For example, a co-continuous substance to which a metal is adhered may be immersed in water at 100° C. to 250° C. and more preferably at 150° C. to 200° C., and the adhered metal may be oxidized to form hydrates of metal oxides.

Since a boiling point of water under atmospheric pressure (0.1 MPa) is 100° C., it is usually not possible to immerse the co-continuous substance in water above 100° C. under atmospheric pressure. However, by using a predetermined airtight container and increasing a pressure in this airtight container to, for example, 10 to 50 MPa and preferably about 25 MPa, a boiling point of water rises in the airtight container, and thereby liquid water at 100° C. to 250° C. can be realized. By immersing the co-continuous substance to which the metal is adhered in the high-temperature water thus obtained, the metal can be formed into hydrates of metal oxides.

Manufacturing Method 7 (Method of Causing Air Electrode to Support Catalyst)

Next, the manufacturing method 7 will be described. In the manufacturing method 7, the co-continuous substance produced as described in the manufacturing method 2 and the manufacturing method 3 is caused to support a catalyst by a method different from those of the manufacturing methods 5 and 6 described above. In the manufacturing method 7, the following first and second catalyst-supporting steps of supporting a catalyst are added in addition to the above-mentioned manufacture of the co-continuous substance. No third catalyst-supporting step is provided in the manufacturing method 7.

In a first catalyst-supporting step, a co-continuous substance is immersed in an aqueous solution of metal salts to adhere the metal salts to a surface of the co-continuous substance.

Next, in the second catalyst-supporting step, the co-continuous substance to which the metal salts have been adhered is caused to act on high-temperature and high-pressure water, and thereby the co-continuous substance is caused to support a catalyst consisting of hydrates of metal oxides made of a metal constituting metal salts.

The metal may be at least one metal of iron, manganese, zinc, copper, or molybdenum.

The first catalyst-supporting step in the manufacturing method 7 is the same as the first catalyst-supporting step in the manufacturing method 6, and the description thereof will be omitted herein.

In the second catalyst-supporting step in the manufacturing method 7, a precursor (metal salt) adhered to the surface of the co-continuous substance is converted into a hydrate of a metal oxide by a heat treatment at a relatively low temperature.

Specifically, the co-continuous substance to which the precursor is adhered is caused to act on high-temperature and high-pressure water, and then dried at a relatively low temperature of about 100° C. to 200° C. Accordingly, the precursor becomes a hydrate in which water molecules are present in particles while still maintaining an amorphous state of the precursor. The hydrate of metal oxides obtained by such drying at a low temperature is used as a catalyst.

In the air electrode produced by the manufacturing method 7, the co-continuous substance may support the hydrate of metal oxides in the form of nano-sized fine particles in a highly dispersed manner. Accordingly, when such a co-continuous substance is used as an air electrode, it is possible for an excellent battery performance to be exhibited.

The co-continuous substance obtained by each of the above-described manufacturing methods can be formed into a predetermined shape by a known procedure and used for an air electrode. For example, a co-continuous substance that supports a catalyst or does not support a catalyst is processed into a plate-like body or a sheet, the obtained co-continuous substance is cut out into a circle having a desired diameter (for example, 23 mm) by a punching blade, a laser cutter, or the like, and this cut body may be used for an air electrode.

EXAMPLES

Figure 7A:
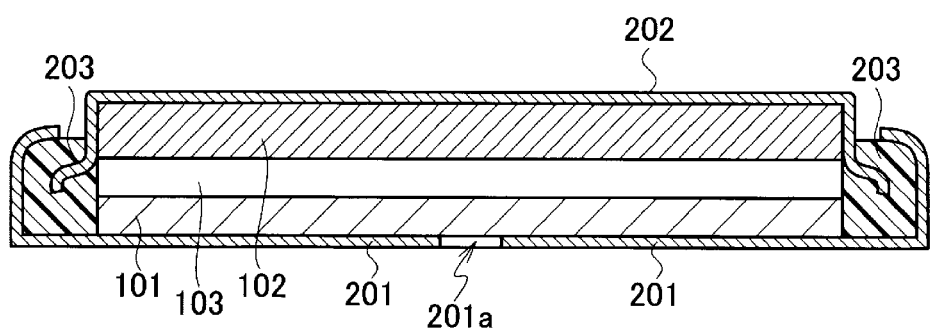
FIG. 7A is a cross-sectional view showing a more detailed configuration example of a coin cell type metal-air battery in an embodiment of the present invention.
Figure 7B:
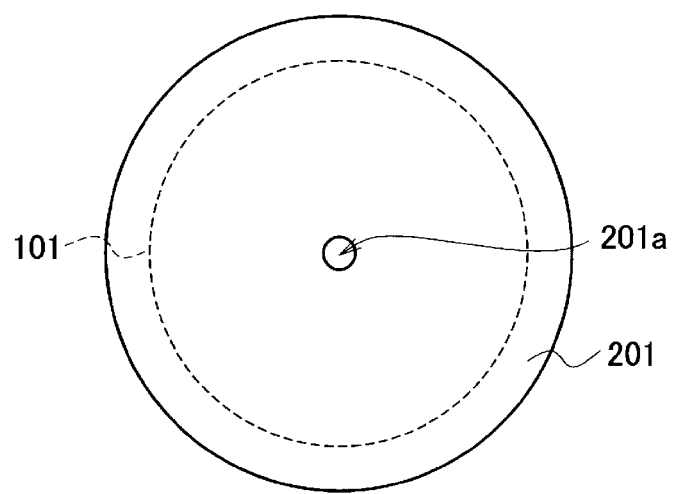
FIG. 7B is a plan view showing a more detailed configuration example of the coin cell type metal-air battery in the embodiment of the present invention.

Hereinafter, a more detailed description will be given with reference to examples. First, a configuration of an actually used battery will be described with reference to FIGS. 7A and 7B. FIG. 7A is a cross-sectional view showing a more detailed configuration example of a coin cell type metal-air battery. Furthermore, FIG. 7B is a plan view showing a configuration example of the coin cell type metal-air battery. FIG. 7B is an external view of the metal-air battery of FIG. 7A as viewed from the bottom to the top. However, the overall size is scaled down due to the finite area limitation of the paper.

The battery formed by using the air electrode 101, the anode 102, and the electrolyte 103 in the above-described embodiment can be produced in a conventional shape such as a coin shape, a cylindrical shape, or a laminate form. The same conventional methods can be used as a method for manufacturing these batteries.

As shown in FIGS. 7A and 7B, the coin cell type battery includes an air electrode 101, an anode 102, and an electrolyte 103 therebetween. The electrolyte 103 in this case is a gel electrolyte obtained by gelling an aqueous solution containing an ion conductor. Furthermore, an air electrode case 201 is disposed on the side of the air electrode 101, and an anode case 202 is disposed on the side of the anode 102. The air electrode case 201 has an opening 201a such that the surrounding air can come into contact with the air electrode 101.

Furthermore, the air electrode case 201 and the anode case 202 are fitted by using a swaging tool or the like, and a gasket 203 is disposed at the fitted portion. The electrolyte 103 is sandwiched between the air electrode 101 and the anode 102 to form a battery cell. This battery cell is disposed between the air electrode case 201 and the anode case 202, and the air electrode case 201 and the anode case 202 are integrated by fitting.

Figure 8:
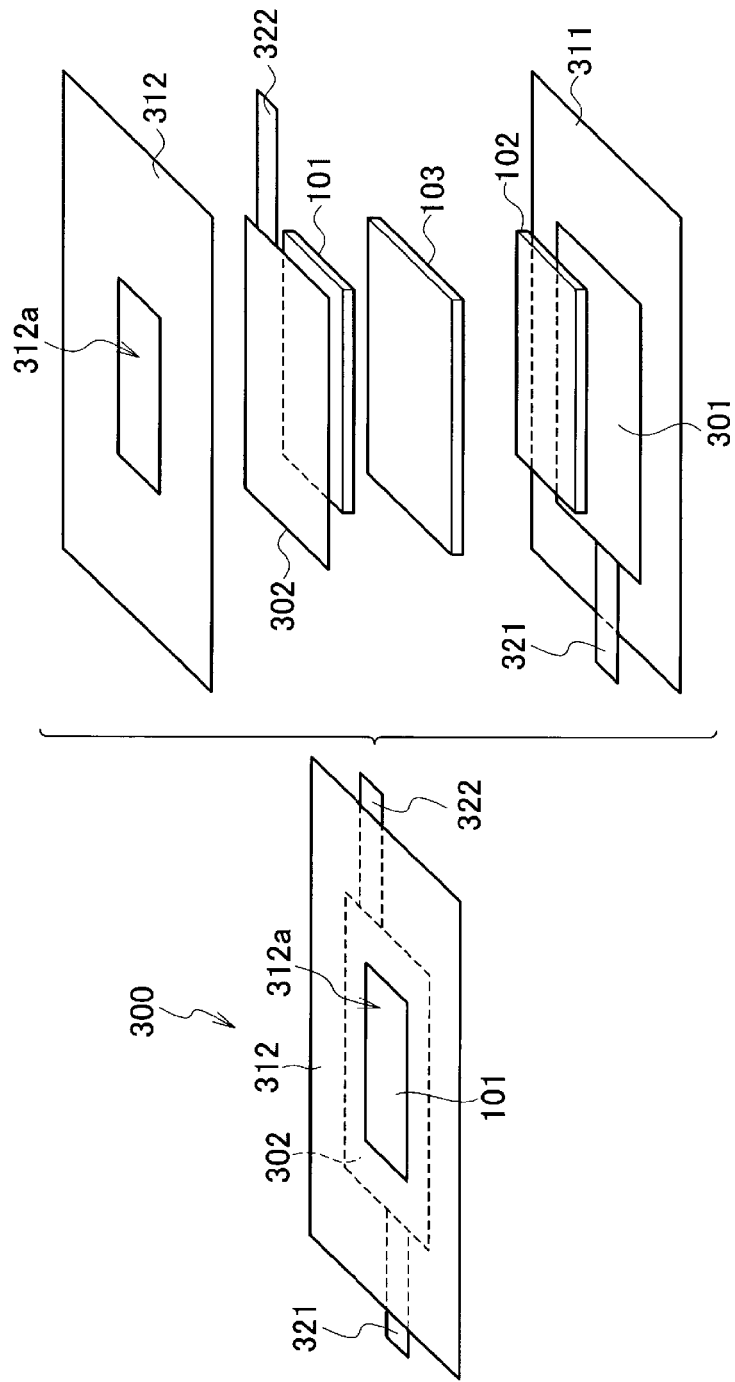
FIG. 8 is a configuration view showing a configuration of the metal-air battery in the embodiment of the present invention.

Furthermore, as shown in FIG. 8, a housing 300 that hermetically seals (seals) the inside of the battery cell other than the air electrode 101 may be used to accommodate the battery cell within the housing 300. The housing 300 includes a first housing 311 disposed on the side of the anode 102 and a second housing 312 disposed on the side of the air electrode 101. An opening 312a is formed in the second housing 312 such that the surrounding air can come into contact with the air electrode 101. Furthermore, a current collector for anodes 301 is provided between the first housing 311 and the anode 102, a current collector for cathodes 302 is provided between the second housing 312 and the air electrode 101, and a terminal 321 and a terminal 322 are respectively taken out from these current collectors toward the outside of the housing 300.

The current collector can be formed from cloth, felt, foil, or a plate consisting of any one of carbon, copper, aluminum, zinc, iron, or calcium, or a mixture thereof. When a metal is used as the anode 102, the terminal may be taken out directly from the anode 102 without using the current collector for anodes 301.

Furthermore, the housing 300 may be constituted of a material that is naturally decomposable as long as the battery cell inside can be maintained. The housing 300 may be made of any material of a natural product-based material, a microbial-based material, or a chemically synthesized material, and it can be constituted of, for example, polylactic acid, polycaprolactone, polyhydroxyalkanoate, polyglycolic acid, modified polyvinyl alcohol, casein, modified starch, and the like. A chemically synthesized material such as plant-derived polylactic acid is particularly preferable. Furthermore, a shape of the housing 300 is not limited as long as it is a shape obtained by processing biodegradable plastic. Examples of materials applicable to the housing 300 include commercially available biodegradable plastic films, papers, on which a resin film such as polyethylene is formed, which is used for milk cartons and the like, agar films, and the like.

It is possible to hermetically seal the inside of the battery cell other than the air electrode 101 by adhering the first housing 311 and the second housing 312, which are constituted of the above-mentioned materials, at a peripheral edge portion. Examples of adhering methods include, but are not particularly limited to, use of a heat seal and an adhesive. It is preferable to use an adhesive constituted of a biodegradable resin. Shapes of the air electrode 101, the anode 102, the electrolyte 103, the first housing 311, the second housing 312, the current collector for anodes 301, and the current collector for cathodes 302 are not limited as long as their shapes do not hinder the disposition of these components regarding operation of the battery. For example, they can be used in a quadrangular or circular sheet shape in a plan view or rolled shape.

The metal-air battery including the housing 300 constituted of the above-mentioned naturally decomposable material naturally decomposes over time when it is used in a disposable device such as a moisture sensor in the soil, and therefore it is not necessary to recover the battery. In addition, environment burdens are extremely low since it is constituted of naturally derived materials and fertilizer components. It is not necessary to recover the battery even when it is used in the natural world such as in a forest or in the sea in addition to the soil, and this battery can be disposed of as burnable garbage when it is used in normal living environments.

Example 1

First, Example 1 will be described. Example 1 is an example in which an electrolyte solution, which was obtained by gelling an aqueous solution containing an ion conductor with a gelling agent consisting of a polysaccharide, was used for a gel electrolyte.

The gel electrolyte was prepared as follows. In the following description, a manufacturing method using agar as a gelling agent is shown as a representative (one example), but a gel electrolyte can be prepared by replacing the agar with a gelling agent made of another material.

First, 20 mL of an aqueous solution of 1.0 mol/L sodium chloride used as an electrolyte solution was put in a beaker, and 300 mg of agar was added thereto. After immersing the agar for 10 to 30 minutes, it was heated at a temperature of 60° C. to 90° C. for about 10 minutes while stirring with a hot stirrer. When the agar was sufficiently dissolved and the liquid changed from a cloudy state to a transparent state, heating was stopped. The liquid was poured into a mold such as a Petri dish and was allowed to stand at room temperature, and thereby a gel electrolyte was obtained. However, when a gelling agent such as gelatin which does not harden at room temperature is used, a gel electrolyte can be obtained by putting a solution in a refrigerator and hardening it. In addition, when an aqueous solution before adding a gelling agent is acidic and the gelling agent decomposing by heating or the like is used, it is necessary to dissolve the gelling agent separately from the aqueous solution by using ion exchange water, and to mix gelling agent into the aqueous solution containing an ion conductor when a temperature drops to a temperature at which the gelling agent does not decompose (around 50° C. to 60° C.)

The battery was cut out into a circle with a diameter of 14 mm using a cutter or the like, and an electrolyte for a coin cell type was obtained in order to evaluate a battery performance using the obtained gel electrolyte. For an air electrode, carbon (KETJENBLACK EC600JD) known for an electrode, KETJENBLACK powder (manufactured by Lion Corporation) and a polytetrafluoroethylene (PTFE) powder (manufactured by Daikin Industries, Ltd.) were sufficiently pulverized and mixed in a weight ratio of 80:20 using a grinding machine, and roll molding was performed. Thereby, a sheet-like electrode (thickness: 0.6 mm) was produced. This sheet-like electrode was cut into a circle with a diameter of 14 mm to obtain an air electrode. An anode was adjusted by cutting out a commercially available metallic zinc plate (thickness 300 μm, manufactured by Nilaco Corporation) into a circle with a diameter of 14 mm using a punching blade, a laser cutter, or the like.

The coin cell type zinc-air battery described with reference to FIGS. 7A and 7B was produced using the above-described gel electrolyte, air electrode, and anode. First, the above-described air electrode was installed in an air electrode case in which a peripheral edge portion of a copper mesh foil (manufactured by MIT Japan) was fixed inside the case by spot welding. Furthermore, in the anode constituted of a metal zinc plate, the peripheral edge portion was fixed to a copper mesh foil (manufactured by MIT Japan) by spot welding, and furthermore, this copper mesh foil was fixed to the anode case by spot welding. Next, the gel electrolyte was placed on the air electrode installed in the air electrode case. Next, the air electrode case was covered with the anode case to which the anode was fixed, and peripheral edge portions of the air electrode case and the anode case were swaged with a coin cell swaging tool. Thereby, a coin cell type zinc-air battery including a polypropylene gasket was produced.

A battery performance of the produced coin cell type air battery was measured. First, a discharge test was performed. For the discharge test of the zinc-air battery, using a commercially available charge and discharge measurement system (SD8 charge/discharge system manufactured by HOKUTO DENKO CORPORATION), a current density of 0.1 mA/cm$^2$ per effective area of the air electrode was applied, and measurement was performed until a battery voltage dropped from an open circuit voltage to 0 V. The discharge test of this battery was supported out in a constant-temperature tank at 25° C. (where the atmosphere was a normal living environment). A discharge capacity was expressed as a value per weight (mAh/g) of the air electrode formed from a co-continuous substance. A discharge curve in Example 1 is shown in FIG. 9.

Figure 9:
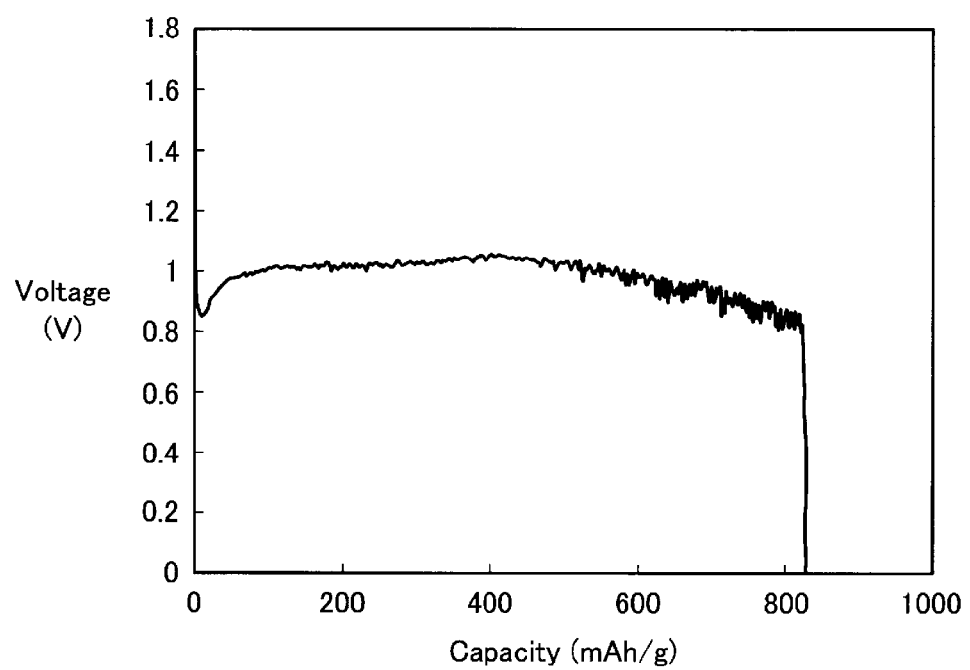
FIG. 9 is a characteristics graph showing a discharge curve for a metal-air battery in Example 1 of the present invention.

As shown in FIG. 9, it can be seen that an average discharge voltage was 1.1 V, and a discharge capacity was 830 mAh/g when the gel electrolyte was used. The average discharge voltage is a battery voltage when a discharge capacity is ½ (415 mAh/g in Example 1) of a discharge capacity of the battery (830 mAh/g in the present example).

Table 1 shows discharge capacities of the zinc-air battery manufactured using each of gel electrolytes which were manufactured by gelling with each type of gelling agent, such as a plant-derived polysaccharide (such as cornstarch, potato starch, tapioca starch, dextrin, tamarind seed gum, guar gum, locust bean gum, gum arabic, karaya gum, pectin, cellulose, konjac mannan, and soybean polysaccharide), a seaweed-derived polysaccharide (such as carrageenan, agar, and alginic acid), a microbial polysaccharide (such as xanthan gum, gellan gum, *Agrobacterium* succinoglycan, and cellulose), and an animal-derived polysaccharide (such as chitin, chitosan, and gelatin).

TABLE 1

| Origin of polysaccharide | Gelling agent | Discharge capacity (mAh/g) |
|---|---|---|
| Plant | Cornstarch | 790 |
| | Potato starch | 800 |
| | Tapioca starch | 810 |
| | Dextrin | 800 |
| | Tamarind seed gum | 800 |
| | Guar gum | 800 |
| | Locust bean gum | 800 |
| | Gum arabic | 800 |
| | Karaya gum | 800 |
| | Pectin | 790 |
| | Cellulose | 820 |
| | Konjac mannan | 810 |
| | Soybean polysaccharide | 800 |
| Seaweed | Carrageenan | 830 |
| | Agar | 830 |
| | Alginic acid | 810 |
| Microorganism | Xanthan gum | 810 |
| | Gellan gum | 800 |
| | Agrobacterium succinoglycan | 800 |
| | Cellulose | 810 |
| Animal | Chitin | 810 |
| | Chitosan | 810 |
| | Gelatin | 800 |
| Acetic acid bacteria that produce polysaccharides | Bacterial cellulose gel | 830 |

TABLE 1-continued

| Origin of polysaccharide | Gelling agent | Discharge capacity (mAh/g) |
|---|---|---|
| Comparative Example 1 | Not used (separator was used) | 680 |

In each of the cases, a discharge capacity was 790 mAh/g or more, which was a larger value than that in Comparative Example 1 to be described later in which evaluation was performed on an electrolyte solution constituted of an aqueous solution of sodium chloride. It is thought that the use of the gel electrolyte improved a discharge capacity because oxygen could be supplied for a long time without submerging the air electrode in the electrolyte solution. Furthermore, it is thought that use of carrageenan or agar further improved a discharge capacity because stability depending on the temperature of the gel was high (60° C. or lower), and a shape of the gel electrolyte could be maintained without separating the gelling agent and the electrolyte solution, and thereby the air electrode was less likely to be submerged.

In addition, a large discharge capacity of 830 mAh/g was exhibited when a bacterial cellulose gel was used as an electrolyte with addition of *Acetobacter xylinum* as a polysaccharide-producing acetic acid bacterium. It is thought that the reason for this was because the stability depending on the temperature of the bacterial cellulose gel was high, the air electrode was less likely to be submerged, and oxygen could be supplied for a long time, as described above.

As described above, according to the present embodiment, improvement of a discharge capacity can be realized by using a gelling agent that is stable at room temperature, such as carrageenan or agar. In addition, since these polysaccharides are naturally derived polysaccharides, they are preferable materials also from the viewpoint of environmental burdens. It is thought that the reason for the above-described improvement in the characteristics was due to various improvements according to the present embodiment.

Example 2

Next, Example 2 will be described. Example 2 is an example in which a co-continuous substance, which had a three-dimensional network structure consisting of a plurality of nanosheets integrated by noncovalent bonds, was used as an air electrode. The air electrode was synthesized as follows. In the following description, a manufacturing method using graphene as a nanosheet will be described as a representative, but when the graphene is changed to nanosheets made of other materials, co-continuous substances having a three-dimensional network structure can be adjusted. A porosity shown below was calculated by modeling pores of the co-continuous substance as a cylindrical form from a pore size distribution obtained by a mercury intrusion method. A method for producing a zinc-air battery and a method of a discharge test were performed in the same manner in Example 1.

First, a commercially available graphene sol [dispersion medium: water ($H_2O$), 0.4% by weight, manufactured by Sigma-Aldrich] was put in a test tube, and this test tube was immersed in liquid nitrogen for 30 minutes to completely complete freeze the graphene sol. After completely freezing the graphene sol, the frozen graphene sol was taken out and put in an eggplant flask and dried in a vacuum of 10 Pa or less with a freeze dryer (manufactured by TOKYO RIKAK-IKAI CO, LTD). Thereby, a stretchable co-continuous substance having a three-dimensional network structure containing graphene nanosheets was obtained.

The obtained co-continuous substance was evaluated by performing X-ray diffraction (XRD) measurement, scanning electron microscope (SEM) observation, porosity measurement, tensile testing, and BET specific surface area measurement. It was confirmed by the XRD measurement that the co-continuous substance produced in the present example was a carbon (C, PDF card No. 01-075-0444) single phase. The PDF card No. is a card number of Powder Diffraction File (PDF), which is database collected by the International Centre for Diffraction Data (ICDD), and the same applies hereinafter.

In addition, it was confirmed by the SEM observation and mercury intrusion method that the obtained co-continuous substance was a co-continuous substance which had an average pore size of 1 μm and in which nanosheets (graphene pieces) were continuously connected. Furthermore, when a BET specific surface area of the co-continuous substance was measured by the mercury intrusion method, it was 510 $m^2/g$. Furthermore, when a porosity of the co-continuous substance was measured by the mercury intrusion method, it was 90% or more. Furthermore, based on the results of the tensile testing, it was confirmed that the obtained co-continuous substance did not exceed an elastic region even when a strain of 20% was applied by a tensile stress, and a shape thereof was restored to the shape before the stress was applied.

Such a co-continuous substance constituted of graphene was cut out into a circle with a diameter of 14 mm by a punching blade, a laser cutter, or the like, and a gas diffusion type air electrode was obtained.

An anode was adjusted by cutting out a commercially available metallic zinc plate (thickness 300 μm, manufactured by Nilaco Corporation) into a circle with a diameter of 14 mm using a punching blade, a laser cutter, or the like.

Regarding an electrolyte, agar was added to a solution obtained by dissolving sodium chloride (NaCl, manufactured by Kanto Chemical Co., Inc.) in pure water at a concentration of 1 mol/L in the same manner as in Example 1, and the obtained solution was used for a gel electrolyte.

Table 2 shows a discharge capacity of a zinc-air battery obtained using, as an air electrode, a co-continuous substance constituted of a nanosheet made of graphene (C), iron oxide ($Fe_2O_3$), manganese oxide ($MnO_2$), zinc oxide (ZnO), molybdenum oxide ($MoO_3$), or molybdenum sulfide ($MoS_2$). When graphene was used in Example 2, a discharge capacity was 900 mAh/g, which was a larger value than that in the case of Example 1 in which the air electrode constituted of the commercially available carbon (KETJEN-BLACK EC600JD) was used.

It is thought that the reason for this is because the air electrode 101 of the metal-air battery was formed from a co-continuous substance having a three-dimensional network structure consisting of a plurality of nanostructures integrated by noncovalent bonds, and when it was combined with a gel-like electrolyte, a large electrode reaction field (three-phase interface) was maintained, and thereby a battery performance was improved.

TABLE 2

| Material of nanosheet | Discharge capacity (mAh/g) |
|---|---|
| Graphene (C) | 900 |
| Iron oxide ($Fe_2O_3$) | 920 |

TABLE 2-continued

| Material of nanosheet | Discharge capacity (mAh/g) |
|---|---|
| Manganese oxide ($MnO_2$) | 930 |
| Zinc oxide (ZnO) | 920 |
| Molybdenum oxide ($MoO_3$) | 890 |
| Molybdenum sulfide ($MoS_2$) | 890 |

A discharge capacity was 890 mAh/g or more even when a co-continuous substance consisting of other materials shown in Table 2 was used for the air electrode. It is thought that, also in a case of nanosheets made of materials other than carbon, as in the case of graphene, because a specific surface area was high, a battery reaction proceeded rapidly, a discharge product [$Zn(OH)_2$] was efficiently produced, and thereby favorable characteristics could be obtained.

Example 3

Next, Example 3 will be described. Example 3 is an example in which a co-continuous substance, which had a three-dimensional network structure consisting of a plurality of nanofibers integrated by noncovalent bonds, was used as an air electrode. The air electrode was synthesized as follows. In the following description, a manufacturing method using carbon nanofibers will be described as a representative, but when the carbon nanofibers are changed to nanofibers made of other materials, co-continuous substances having a three-dimensional network structure can be adjusted.

A method of evaluating a co-continuous substance, a method for producing a zinc-air battery, and a method of a discharge test were performed in the same manner in Examples 1 and 2.

A co-continuous substance was produced in the same manner as in the process shown in Example 2, and a carbon nanofiber sol [dispersion medium: water ($H_2O$), 0.4% by weight, manufactured by Sigma-Aldrich] was used as a raw material.

The obtained co-continuous substance was evaluated by performing XRD measurement, SEM observation, porosity measurement, tensile testing, and BET specific surface area measurement. It was confirmed by the XRD measurement that the co-continuous substance produced in the present example was a carbon (C, PDF card No. 00-058-1638) single phase. In addition, it was confirmed by the SEM observation and mercury intrusion method that the obtained co-continuous substance was a co-continuous substance which had an average pore size of 1 µm and in which nanofibers were continuously connected. Furthermore, when a BET specific surface area of the co-continuous substance was measured by the mercury intrusion method, it was 620 $m^2/g$. Furthermore, when a porosity of the co-continuous substance was measured by the mercury intrusion method, it was 93% or more. Furthermore, based on the results of the tensile testing, it was confirmed that the co-continuous substance of Example 3 did not exceed an elastic region even when a strain of 40% was applied by a tensile stress, and a shape thereof was restored to the shape before the stress was applied.

Using this co-continuous substance constituted of carbon nanofiber as the air electrode, a coin cell type zinc-air battery similar to that of Example 2 was produced. Table 3 shows a discharge capacity of the zinc-air battery produced in Example 3. In Example 3, a discharge capacity was 1020 mAh/g, which was a larger value than that in the case of Example 2 in which the co-continuous substance constituted of graphene was used. It is thought that the reason for such improvement in characteristics was due to a reaction being smoothly supported out at the time of discharge by using the co-continuous substance having higher stretchability.

Table 3 shows a discharge capacity of a zinc-air battery obtained using, as an air electrode, a co-continuous substance constituted of a nanofiber made of carbon nanofibers (C), iron oxide ($Fe_2O_3$), manganese oxide ($MnO_2$), zinc oxide (ZnO), molybdenum oxide ($MoO_3$), or molybdenum sulfide ($MoS_2$).

TABLE 3

| Material of nanofiber | Discharge capacity (mAh/g) |
|---|---|
| Carbon nanofiber (C) | 1020 |
| Iron oxide ($Fe_2O_3$) | 1000 |
| Manganese oxide ($MnO_2$) | 1040 |
| Zinc oxide (ZnO) | 1010 |
| Molybdenum oxide ($MoO_3$) | 990 |
| Molybdenum sulfide ($MoS_2$) | 980 |

In each of the cases, a discharge capacity was 980 mAh/g or more, which was a generally larger value than that of the co-continuous substance containing nanosheets as described in Example 2 shown in Table 2. It is thought that, also in the case of these nanofibers, a battery reaction producing a discharge product [$Zn(OH)_2$] proceeded efficiently by using the air electrode having stretchability, and thereby a discharge capacity was improved, as in the case of carbon nanofibers.

Example 4

Next, Example 4 will be described. In Example 4, an air electrode in which a co-continuous substance made of carbon nanofibers was caused to support an oxide or a metal as a catalyst will be described. Hereinafter, a case where the co-continuous substance supported $MnO_2$ as a catalyst will be described as a representative, but the co-continuous substance can support an arbitrary oxide as a catalyst by changing Mn to an arbitrary metal. Furthermore, the co-continuous substance can support any metal as a catalyst by not performing a neutralization step.

A method of evaluating a co-continuous substance, a method for producing a zinc-air battery, and a method of a discharge test were performed in the same manner in Examples 1 and 2.

The co-continuous substance was produced in the same manner as in Example 3. Next, a commercially available manganese(II) chloride tetrahydrate ($MnCl_2 \cdot 4H_2O$; manufactured by Kanto Chemical Co., Inc.) was dissolved in distilled water, and the produced co-continuous substance was impregnated therewith to cause the co-continuous substance to support manganese chloride. Next, ammonia water (28%) was gradually added dropwise to the co-continuous substance supporting manganese chloride (manganese chloride supported by the co-continuous substance) until a pH reached 7.0, and the mixture was neutralized to precipitate manganese hydroxide. The precipitate was washed with distilled water 5 times so that chlorine did not remain.

The obtained co-continuous substance supporting manganese hydroxide was heat-treated at 500° C. for 6 hours in an argon atmosphere, and thereby a co-continuous substance supporting manganese oxide ($MnO_2$) was produced. The produced co-continuous substance supporting manganese oxide was evaluated by XRD measurement and TEM observation. A peak of manganese oxide ($MnO_2$, PDF file No. 00-011-079) could be observed from the XRD measurement. It was confirmed that the catalyst supported by the co-continuous substance was a manganese oxide single phase. Furthermore, it was observed by TEM that manganese oxide was precipitated in a particle form having an average particle size of 100 nm on the surface of the co-continuous substance.

Using this co-continuous substance supporting manganese oxide as the air electrode, a coin cell type zinc-air battery similar to that of Example 1 was produced. A discharge capacity of the zinc-air battery produced in Example 4 was 1140 mAh/g. In addition, Table 4 shows results of cases using other catalysts.

TABLE 4

| Material of catalyst and co-continuous substance | Discharge capacity (mAh/g) |
|---|---|
| $MnO_2$/carbon nanofiber | 1140 |
| $Fe_2O_3$/carbon nanofiber | 1020 |
| $ZnO_2$/carbon nanofiber | 1000 |
| $MoO_3$/carbon nanofiber | 1100 |
| Fe/carbon nanofiber | 1010 |
| Mn/carbon nanofiber | 1010 |
| Zn/carbon nanofiber | 1030 |
| Mo/carbon nanofiber | 1000 |

In Example 4, a discharge capacity was 1,000 mAh/g or more in any case, which was a larger value than that in the case of Example 3 in which the co-continuous substance not supporting manganese oxide as a catalyst was used. It was confirmed that the air electrode of the zinc-air battery of the present example operated stably.

Example 5

Next, Example 5 will be described. In Example 5, a case in which a co-continuous substance made of a gel in which nanofibers produced by bacteria were dispersed was caused to further support manganese oxide as a catalyst on will be described. In the following description, a case where a co-continuous substance was produced from nanofibers made of iron oxide produced by iron bacteria is shown as a representative, but co-continuous substances made of nanofibers made of manganese oxide can be adjusted by changing iron bacteria to arbitrary bacteria.

A method of evaluating a co-continuous substance, a method for producing a zinc-air battery, and a method of a discharge test were performed in the same manner in Examples 1 and 2.

First, iron bacteria, *Leptothrix ochracea* were put into a JOP liquid medium in a test tube together with small pieces of iron (purity 99.9% or more, manufactured by Kojundo Chemical Laboratory Co., Ltd.), and culturing was performed at 20° C. for 14 days with a shaker. The JOP liquid medium was a medium in which a pH was adjusted to 7.0 with an aqueous solution of sodium hydroxide, and which contained 0.076 g of disodium hydrogen phosphate dodecahydrate, 0.02 g of potassium dihydrogen phosphate dihydrate, 2.383 g of 4-(2-hydroxyethyl)-1-piperazine ethanesulfonic acid [HEPES: substance for buffer solution], and 0.01 mmol/L of iron sulphate in 1 L of sterilized groundwater. In addition, *Leptothrix ochracea* was purchased from ATCC (American Type Culture Collection) (ATCC).

After culturing, the small pieces of iron were removed, and the obtained gel was washed in pure water for 24 hours using a shaker. In this washing, the pure water was replaced three times. The processes shown in Examples 2 and 4 were supported out using the washed gel as a raw material, and thereby a zinc-air battery in which a co-continuous substance, which was caused to support manganese oxide and was made of nanofibers produced by bacteria, was used as an air electrode was produced.

The obtained co-continuous substance was evaluated by performing XRD measurement, SEM observation, porosity measurement, tensile testing, and BET specific surface area measurement. It was confirmed by the XRD measurement that the co-continuous substance produced in the present example was amorphous $Fe_3O_4$ and $\gamma$-$Fe_2O_3$ ($Fe_3O_4$, PDF card No. 01-075-1372; $\gamma$-$Fe_2O_3$, PDF card No. 00-039-1346). Furthermore, it was confirmed by the SEM observation that the co-continuous substance was a co-continuous substance in which hollow nanofibers (nanotubes) having a diameter of 1 μm were continuously connected. Furthermore, when a BET specific surface area of the co-continuous substance was measured by the mercury intrusion method, it was 800 m²/g. Furthermore, when a porosity of the co-continuous substance was measured by the mercury intrusion method, it was 95% or more. Furthermore, based on the results of the tensile testing, it was confirmed that the co-continuous substance did not exceed an elastic region even when a strain of 60% was applied by a tensile stress, and a shape thereof was restored to the shape before the stress was applied.

A discharge capacity of the zinc-air battery, in which the co-continuous substance made of iron oxide nanofibers produced by iron bacteria in Example 5 was used as the air electrode, was 1210 mAh/g. In addition, Table 5 shows results of cases using other co-continuous substances.

TABLE 5

| Material of catalyst and co-continuous substance | Discharge capacity (mAh/g) |
|---|---|
| $MnO_2$/iron oxide produced by bacteria | 1210 |
| $MnO_2$/$MnO_2$ produced by bacteria | 1190 |

In Example 5, a value was somewhat larger than that in the case of Example 4 in which the co-continuous substance made of carbon nanofibers supporting manganese oxide was used. This result is thought to be due to a reaction being smoothly supported out at the time of discharge by using the co-continuous substance having higher stretchability.

Furthermore, as shown in Table 5, a discharge capacity of the zinc-air battery, in which the co-continuous substance made of manganese oxide produced by bacteria was used as the air electrode catalyzed by manganese oxide, was 1,190 mAh/g, which was a larger value than that of Example 4. The manganese oxide produced by bacteria was produced by culturing in the same manner as described above using small pieces of manganese (purity 99.9% or more, manufactured by Kojundo Chemical Laboratory Co., Ltd.) and using manganese bacteria, *Leptothrix discophora*. *Leptothrix discophora* was purchased from ATCC. It is thought that, also in the case of these nanofibers produced by bacteria, a battery reaction producing a discharge product [$Zn(OH)_2$] proceeded efficiently by using the air electrode having excellent stretchability and produced by bacteria, and thereby a discharge capacity was improved, as in the case of iron oxide produced by iron bacteria.

Example 6

Next, Example 6 will be described. In Example 6, a case in which a co-continuous substance made of a gel in which cellulose produced by bacteria were dispersed was caused to further support manganese oxide as a catalyst will be described. A method of evaluating a co-continuous substance, a method for producing a zinc-air battery, and a method of a discharge test were performed in the same manner in Examples 1 and 2.

First, using Nata de coco (manufactured by Fujicco Co., Ltd.) as a bacterial cellulose gel produced by acetic acid bacteria, *Acetobacter xylinum*, a zinc-air battery was produced in the same manner as in the processes shown in Examples 2 and 4. In Example 6, after drying in a vacuum, a co-continuous substance was carbonized by firing it at 1,200° C. for 2 hours in a nitrogen atmosphere, and thereby an air electrode was produced.

The obtained co-continuous substance (carbonized co-continuous substance) was evaluated by performing XRD measurement, SEM observation, porosity measurement, tensile testing, and BET specific surface area measurement. It was confirmed by the XRD measurement that this co-continuous substance was a carbon (C, PDF card No. 01-071-4630) single phase. Furthermore, it was confirmed by the SEM observation that the co-continuous substance was a co-continuous substance in which nanofibers having a diameter of 20 nm were continuously connected. Furthermore, when a BET specific surface area of the co-continuous substance was measured by the mercury intrusion method, it was 830 $m^2/g$. Furthermore, when a porosity of the co-continuous substance was measured by the mercury intrusion method, it was 99% or more. Furthermore, based on the results of the tensile testing, it was confirmed that the co-continuous substance did not exceed an elastic region even when a strain of 80% was applied by a tensile stress, that a shape thereof was restored to the shape before the stress was applied, and that the co-continuous substance had excellent stretchability even after it was carbonized.

A discharge capacity of the zinc-air battery in Example 6 is shown in Table 6. Table 6 also shows the results of Examples 1, 2, 3, 4, and 5. In Example 6, a discharge capacity was 1,480 mAh/g, which was a larger value than that in the case of Example 5 in which the co-continuous substance which contained iron oxide produced by iron bacteria and supported manganese oxide was used.

TABLE 6

| Example | Average discharge voltage (V) | Discharge capacity (mAh/g) |
| --- | --- | --- |
| Comparative Example 1 (KETJENBLACK) *Electrolyte was solution | 0.9 | 680 |
| Example 1 (KETJENBLACK) | 1.0 | 830 |
| Example 2 (graphene) | 1.0 | 900 |
| Example 3 (carbon nanofiber) | 1.0 | 1020 |
| Example 4 ($MnO_2$/carbon nanofiber) | 1.1 | 1140 |
| Example 5 ($MnO_2$/iron oxide produced by bacteria) | 1.1 | 1210 |
| Example 6 ($MnO_2$/oxide bacterial cellulose) | 1.2 | 1480 |

When Comparative Example 1 and Example 1 were compared, it is thought that gelling of the electrolyte improved a discharge capacity because oxygen could be supplied for a long time without submerging the air electrode in the electrolyte solution. Furthermore, it is thought that a reaction producing a discharge product [$Zn(OH)_2$] at the time of discharge proceeded more smoothly because C as a material had excellent conductivity in addition to the condition in which the co-continuous substance structure with higher stretchability was used for the air electrode.

As described above, according to the present embodiment, it is possible to obtain a co-continuous substance having a high porosity, a BET specific surface area measurement, and stretchability. Furthermore, according to the zinc-air battery constituted of the air electrode of this co-continuous substance and the gel electrolyte, a battery reaction proceeds efficiently, and thereby it is possible to realize improvement in discharge capacity. It is thought that the reason for the above-described improvement in the characteristics was due to improvements in the air electrode and the electrolyte according to the present embodiment.

Example 7

Next, Example 7 will be described. In Example 7, a case in which a type of metal used for the anode was changed by using the co-continuous substance of Example 6 will be described. A method for producing a battery and a method of a discharge test were performed in the same manner in Examples 1 and 2.

Table 7 shows a discharge capacity of a metal-air battery each including a magnesium alloy plate, an aluminum plate, a zinc plate, and an iron plate as an anode.

TABLE 7

| Anode metal | Average discharge voltage (V) | Discharge capacity (mAh/g) |
| --- | --- | --- |
| Zinc | 1.2 | 1480 |
| Magnesium alloy | 1.3 | 1830 |
| Aluminum | 1.2 | 1650 |
| Iron | 1.1 | 1440 |

In Example 7, when the magnesium alloy plate was used for the anode, a discharge capacity was 1,830 mAh/g and a voltage was about 1.3 V, which were larger values than those of cases in which other metals were used.

It is thought that the reason for the above-mentioned difference in characteristics is because the ionization potential of metals affected ease of dissolution in an electrolyte solution, and because electrons generated by dissolution of the anode metal were most efficiently used for a battery reaction when the magnesium alloy plate was used for the anode.

As described above, according to the present embodiment, the most efficient flow of electrons at the time of discharge was realized by using the magnesium alloy plate for the anode of the metal-air battery constituted of the above-described co-continuous substance as the air electrode. It is thought that the reason for the above-described improvement in the characteristics was due to various improvements according to the present embodiment.

Example 8

Next, Example 8 will be described. In Example 8, a case in which the same co-continuous substance as that of Example 6 was used, a magnesium alloy plate was used for an anode, and an ion conductor was changed will be described. A method for producing a battery and a method of a discharge test were performed in the same manner in Examples 1 and 2. Regarding adjustment of an electrolyte solution, a purely dissolved solution at a concentration of 1 mol/L was used as in Example 1, but for magnesium citrate and calcium citrate, a solution obtained by dissolving them in 0.1 mol/L citric acid was used because their solubility in water is small.

Table 8 shows a discharge capacity of a metal-air battery in which each of the following materials was used as an electrolyte, and a pH value before and after measurement, where the materials are: hydrochloric acid, sodium chloride, magnesium chloride, potassium chloride, calcium chloride, acetic acid, sodium acetate, magnesium acetate, potassium acetate, calcium acetate, carbonic acid, sodium carbonate, magnesium carbonate, potassium carbonate, calcium carbonate, citric acid, sodium citrate, magnesium citrate, potassium citrate, calcium citrate, phosphoric acid, HEPES, sodium pyrophosphate, and sodium metaphosphate.

Figure 10:
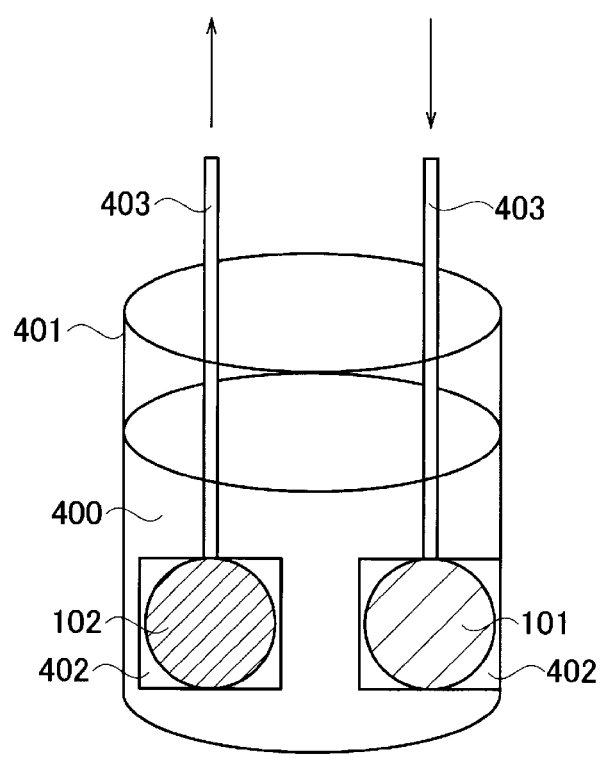
FIG. 10 is a configuration view showing a configuration of a cell when measuring a pH in Example 8 of the present invention.

A pH meter (D-52 manufactured by HORIBA, Ltd.) was used to measure a pH, and as shown in FIG. 10, a battery reaction was allowed to proceed in a beaker cell 401 filled with an electrolyte solution 400, and a pH before and after the reaction was measured. An anode 102 and an air electrode 101 were adjusted by cutting them out into a circle having a diameter of 14 mm with a punching blade, a laser cutter, or the like. First, a peripheral edge portion of a copper mesh foil 402 (manufactured by MIT Japan) was fixed by spot welding, and the above-mentioned air electrode 101 was installed inside the copper mesh foil 402. In addition, in the same manner, the anode 102 formed from a magnesium alloy plate was also fixed inside the copper mesh foil 402 (manufactured by MIT Japan) by spot welding. Copper ribbons 403 were respectively fixed to these anode and air electrode in advance by spot welding, a charge and discharge measurement system (SD8 charge/discharge system manufactured by HOKUTO DENKO CORPORATION) (not shown) was brought into contact with this copper ribbon 403, a current density of 0.1 mA/cm² per effective area of the air electrode 101 was applied, and the current was allowed to flow until a battery voltage dropped from an open circuit voltage to 0 V.

TABLE 8

| Electrolyte | Discharge capacity (mAh/g) | pH Before | pH After |
|---|---|---|---|
| Hydrochloric acid | 1000 | 1.9 | 2.8 |
| Sodium chloride | 1830 | 7.4 | 11.2 |
| Magnesium chloride | 1790 | 7.3 | 10.9 |
| Potassium chloride | 1810 | 7.1 | 10.8 |
| Calcium chloride | 1800 | 7.2 | 11.0 |
| Acetic acid | 2000 | 6.5 | 10.8 |
| Sodium acetate | 2200 | 6.2 | 8.8 |
| Magnesium acetate | 2250 | 6.1 | 8.3 |
| Potassium acetate | 2110 | 6.2 | 8.9 |
| Calcium acetate | 2080 | 5.9 | 8.8 |
| Carbonic acid | 1760 | 6.7 | 11.3 |
| Sodium carbonate | 1820 | 6.9 | 11.4 |
| Magnesium carbonate | 1930 | 6.8 | 11.2 |
| Potassium carbonate | 1910 | 6.8 | 11.1 |
| Calcium carbonate | 1900 | 6.7 | 11.0 |
| Citric acid | 990 | 2.7 | 3.0 |
| Sodium citrate | 1980 | 6.3 | 9.5 |

TABLE 8-continued

| Electrolyte | Discharge capacity (mAh/g) | pH Before | pH After |
|---|---|---|---|
| Magnesium citrate | 2180 | 5.6 | 9.4 |
| Potassium citrate | 2060 | 6.4 | 9.6 |
| Calcium citrate | 2070 | 5.7 | 9.6 |
| Phosphoric acid | 910 | 6.2 | 8.8 |
| HEPES | 1890 | 6.3 | 10.5 |
| Sodium pyrophosphate | 1940 | 6.1 | 10.6 |
| Sodium metaphosphate | 1920 | 6.2 | 10.4 |

In Example 8, a discharge capacity was 2,250 mAh/g when magnesium acetate was used as the electrolyte, and this was a larger value than that in the cases of in Examples 1 to 7 in which sodium chloride was used as the electrolyte.

Based on Table 8, when a strong acid salt such as hydrochloric acid or citric acid was used for an electrolyte solution as an effective salt for improving the characteristics, the anode dissolved quickly, and thereby a discharge capacity became very small. Furthermore, an electrolyte solution not containing chloride ions was considered to be able to inhibit corrosion of the anode due to the chloride ions, and was considered to have the greatest effect on a discharge capacity. When a weak acid salt such as acetate or citrate was used, it is thought that a discharge capacity could be further improved because an increase in pH of the electrolyte solution could be inhibited, and a passive state was unlikely to be formed on the surface of the anode. Magnesium salts had the largest volume among the categories of acetate, carbonate, and citrate, and it is thought that the reason for this is because self-corrosion of magnesium as the anode was inhibited by dissolving the magnesium salts as an electrolyte in advance.

As described above, according to the present embodiment, improvement in discharge capacity was realized by using magnesium acetate. Furthermore, because magnesium acetate is a component that is also used as a fertilizer, it is a preferable electrolyte solution also from the viewpoint of environmental burdens. It is thought that the reason for the above-described improvement in the characteristics was due to various improvements according to the present embodiment.

Example 9

Next, Example 9 will be described. In Example 9, based on the results of Examples 1 to 8, a case of producing a magnesium-air battery in which a co-continuous substance made of a gel in which cellulose produced by bacteria was dispersed was caused to further support manganese oxide as a catalyst and in which a magnesium alloy was used for an anode, magnesium acetate was used for an ion conductor, and agar was used for a gelling agent will be described. This magnesium-air battery naturally decomposes together with a housing as described with reference to FIG. 8. A method of synthesizing the co-continuous substance supporting manganese oxide as a catalyst, a method of evaluating the co-continuous substance, and a method of a charging and discharging test were supported out in the same manner as in Example 5.

Hereinafter, a method for manufacturing the magnesium-air battery in Example 9 will be described. An anode was produced by cutting a commercially available magnesium alloy plate (thickness 200 µm, manufactured by The Nilaco Corporation) into a square of 20 mm×20 mm using scissors.

An electrolyte was adjusted by dissolving magnesium acetate ($Mg(CH_3COO)_2$, manufactured by Kanto Chemical Co., Inc.) in pure water at a concentration of 1 mol/L, 1% of agar was added thereto, and the mixture was heated at 80° C. for 10 minutes while stirring. Thereafter, the mixture was poured into a Petri dish and allowed to stand at room temperature. After solidifying, the solidified product was cut into a square of 25 mm×25 mm from a Petri dish and used for a gel electrolyte.

A peripheral edge portion of the anode made of the magnesium alloy plate was fixed to a copper mesh foil (manufactured by MIT Japan) which was a current collector for anodes by spot welding, and this copper mesh foil was further cut into a size of 25 mm×25 mm in a plan view. The end thereof was spot-welded to a short side of a copper foil (manufactured by Nilaco Corporation) which was cut into 3×20 mm and used for a terminal.

In addition, the air electrode was crimped to a copper mesh foil (manufactured by MIT Japan) which was cut to 25 mm×25 mm as a current collector for air electrodes, and the end of this copper mesh foil was spot-welded to a short side of a copper foil (manufactured by Nilaco Corporation) which was cut into 3×20 mm and used for a terminal.

A plant-based film sheet ECOLOJU (manufactured by Mitsubishi Plastics, Inc.) was used as a material for housings. This sheet was cut into 30 m×30 mm in a plan view to produce two cut sheets, one of which was used as a first housing and the other of which was used as a second housing. Furthermore, an opening of 15 mm×15 mm was formed in a center portion in the second housing used on the cathode side.

A current collector for anodes on which the anode was fixed, and a gel electrolyte were disposed on the first housing on the anode side, and the gel electrolyte was further covered with the current collector for air electrodes to which the air electrode was crimped, and the second housing. Peripheral edge portions (width of about 5 mm) on the inner side of the first housing and the second were adhered with a biodegradable resin (manufactured by Miyoshi Oil & Fat Co., Ltd.) for hermetical sealing. A magnesium-air battery was produced in this manner.

A discharge capacity of the magnesium-air battery in Example 9 is shown in Table 9. Table 9 also shows the results of Examples 8, 9, and 10. As shown in Table 9, in Example 9, a discharge capacity was 1,900 mAh/g, and discharge characteristics were almost the same as those in Example 7.

TABLE 9

| Example | Porosity | Anode metal | Electrolyte | Average discharge voltage (V) | Discharge capacity (mAh/g) |
|---|---|---|---|---|---|
| Example 8 | MnO$_2$/carbonized bacterial cellulose | Magnesium alloy | Gel electrolyte of magnesium acetate | 1.5 | 2250 |
| Example 9 | | | | 1.4 | 1900 |
| Example 10 | | | | 1.4 | 1810 |

When the magnesium-air battery of Example 9 was installed in the soil after being discharged, decomposition of the housing could be visually confirmed in about half a month, and the housing completely disappeared in about one month. It was shown that the housing was metabolized and decomposed by microorganisms in the soil.

Example 10

Next, Example 10 will be described. In Example 10, a magnesium-air battery produced in the same procedure as in Example 9 was subjected to a discharge test in an environment simulating soil. Specifically, a 1/10,000a Neubauer pot was filled with 540 g of decomposed granite soil that had passed through a 2 mm sieve, and the pot was covered with 70 g of sandy soil, and the magnesium battery was embedded such that only the terminals of the battery were exposed on the upper part of the sandy soil. The battery was connected to a measuring device from these terminals, and a discharge capacity was measured in the same manner as in Example 1.

A discharge capacity of the magnesium-air battery in Example is shown in Table 9. As shown in Table 9, in Example 10, a discharge capacity was 1,810 mAh/g, which was lower than that in Example 9, but it was shown that the battery operated even in a soil environment without problems. In addition, when the magnesium-air battery of Example 10 was left in the soil after being discharged, it completely disappeared about one month after the start of the discharge test.

Comparative Example 1

Next, Comparative Example 1 will be described. In Comparative Example 1, a zinc-air battery cell constituted of carbon (KETJENBLACK EC600JD), which is known as an electrode for an air electrode, and manganese oxide was produced and evaluated. In Comparative Example 1, a coin cell type zinc-air battery similar to that of Example 1 was produced. An aqueous solution of sodium chloride (1 mol/L) was used as an electrolyte, and a cellulosic separator (manufactured by NIPPON KODOSHI CORPORATION) was used as a separator.

A manganese oxide powder (manufactured by Kanto Chemical Co., Inc.), a KETJENBLACK powder (manufactured by Lion Corporation), and a polytetrafluoroethylene (PTFE) powder (manufactured by Daikin Industries, Ltd.) were sufficiently pulverized and mixed in a weight ratio of 50:30:20 using a grinding machine, and roll molding was performed. Thereby, a sheet-like electrode (thickness: 0.5 mm) was produced. This sheet-like electrode was cut into a circle with a diameter of 14 mm to obtain an air electrode. Conditions for a discharge test of the battery were the same as those in Example 1.

A discharge capacity of the zinc-air battery according to Comparative Example 1 is shown in Table 6 together with the results of Examples 1 to 6. As shown in Table 6, a discharge capacity of Comparative Example 1 was 680 mAh/g, which was a smaller value than that of Example 1. Furthermore, when the air electrode of Comparative Example 1 was observed after the measurement, it was shown that a part of the air electrode collapsed and dispersed in the electrolyte solution, and the electrode structure of the air electrode was destroyed.

Based on the above results, it was confirmed that the metal-air battery of the present embodiment is excellent in capacity and voltage than the metal-air battery constituted of an air electrode made of a known material.

As described above, according to the present embodiment, since the air electrode 101 of the metal-air battery was formed from the co-continuous substance having a three-dimensional network structure consisting of a plurality of nanostructures integrated by noncovalent bonds, the metal-air battery was handled more easily, and when it was combined with a gel-like electrolyte, a large electrode reaction field (three-phase interface) was kept, and thereby a battery performance could be improved.

Furthermore, the metal-air battery of the present embodiment does not contain elements used for soil fertilizers and metal elements other than metals contained in rainwater and seawater, and naturally decomposes, and therefore environmental burdens are extremely low. Such battery can be effectively used as various driving sources such as disposable batteries in daily environments and sensors to be used in soil.

Furthermore, according to the present embodiment, a discharge capacity of the metal-air battery can be greatly increased by selecting an appropriate type for an anode metal and an electrolyte solution. That is, since the air electrode 101 of the metal-air battery was formed from the co-continuous substance having a three-dimensional network structure consisting of a plurality of nanostructures integrated by noncovalent bonds, and the electrolyte 103 interposed between the air electrode and anode was constituted of salts not containing chloride ions, it is possible to efficiently use electrons, and to inhibit passivation and self-corrosion of the anode, and thereby a discharge capacity of the metal-air battery can be greatly increased. Furthermore, since the anode 102 is constituted of any metal of magnesium, aluminum, calcium, iron, and zinc, or an alloy thereof, a discharge capacity of the metal-air battery can be further greatly increased.

Furthermore, in the present embodiment, the air electrode is not completely immersed in the electrolyte solution by using the gel electrolyte as the electrolyte of the metal-air battery, and thereby oxygen can be supplied to the air electrode. Accordingly, a reaction of "$\frac{1}{2}O_2+H_2O+2e^- \rightarrow 2OH^-$" in the air electrode is promoted, and a battery performance is improved. In addition, since the gel electrolyte is constituted of at least one of polysaccharides that are also used as food additives and a group of acetic acid bacteria that produce polysaccharides, a battery incurring a low environmental burden is obtained.

Furthermore, in the present embodiment, an excellent effect of improving a battery performance can be obtained while still maintaining a low environmental burden by forming the metal-air battery using the air electrode formed from the co-continuous substance having a three-dimensional network structure in which plurality of nanostructures are integrated by noncovalent bonds, and using the gel electrolyte consisting of at least one of polysaccharides and a group of acetic acid bacteria.

The present invention is not limited to the embodiments described above, and it is apparent that many modifications and combinations can be supported out by a person having ordinary knowledge in the art within the technical idea of the present invention.

REFERENCE SIGNS LIST

101 Air electrode
102 Anode
103 Electrolyte
201 Air electrode case
202 Anode case
203 Gasket
300 Housing
301 Current collector for anodes
302 Current collector for cathodes
311 First housing
312 Second housing
321 Terminal
322 Terminal
400 Electrolyte
401 Beaker cell
402 Copper mesh foil
403 Copper ribbon

The invention claimed is:

1. A metal-air battery comprising:
   an air electrode formed from a co-continuous substance having a three- dimensional network structure in which a plurality of nanostructures are integrated by noncovalent bonds;
   an anode;
   an electrolyte disposed between the air electrode and the anode, wherein the electrolyte is a gel electrolyte obtained by gelling an aqueous solution containing an ion conductor with a gelling agent, and the gelling agent is constituted of at least one of a plant-derived polysaccharide, a seaweed-derived polysaccharide, or an animal-derived polysaccharide;
   a first housing disposed on a side of the anode;
   a second housing disposed on a side of the air electrode, the second housing including an opening configured to allow the air electrode to come into contact with the surrounding air;
   a first current collector provided between the first housing and the anode;
   a second current collector provided between the second housing and the air electrode;
   a first terminal connecting the first current collector to an outside of the first housing; and
   a second terminal connecting the second current collector to an outside of the second housing.

2. The metal-air battery according to claim 1, wherein the ion conductor is constituted of one or more of a chloride, an acetate, a carbonate, a citrate, a phosphate, 4-(2-hydroxyethyl)-1-piperazine ethanesulfonic acid (HEPES), a pyrophosphate, or a metaphosphate.

3. The metal-air battery according to claim 1, wherein the plurality of nanostructures of the air electrode are a nanosheet constituted of at least one of carbon, iron oxide, manganese oxide, zinc oxide, molybdenum oxide, or molybdenum sulfide, or are nanofibers constituted of at least one of carbon, iron oxide, manganese oxide, zinc oxide, molybdenum oxide, molybdenum sulfide, or cellulose.

4. The metal-air battery according to claim 1, wherein the anode is constituted of one or more of magnesium, aluminum, calcium, iron, or zinc.

5. The metal-air battery according to claim 1, wherein the air electrode supports a catalyst constituted of at least one metal of iron, manganese, zinc, copper, or molybdenum, or an oxide of at least one metal of calcium, iron, manganese, zinc, copper, or molybdenum.

6. A method for manufacturing an air electrode of the metal-air battery according to claim 1, the method comprising:
   a freezing step of freezing a sol or gel in which the plurality of nanostructures are dispersed, to obtain a frozen substance; and
   a drying step of drying the frozen substance in a vacuum, to obtain the co-continuous substance.

7. A method for manufacturing an air electrode of the metal-air battery according to claim 1, the method comprising:

a gel production step of allowing bacteria to produce a gel in which nanofibers constituted of iron oxide or manganese oxide are dispersed;

a freezing step of freezing the gel; and a drying step of drying the gel as a frozen substance.

8. A method for manufacturing an air electrode of the metal-air battery according to claim 1, the method comprising:

a gel production step of allowing bacteria to produce a gel in which nanofibers constituted of cellulose are dispersed;

a freezing step of freezing the gel;

a drying step of drying the gel as a frozen substance; and a carbonization step of heating the co-continuous substance which has been obtained by the drying in a gaseous atmosphere in which cellulose does not combust, to carbonize the co-continuous substance.

9. The metal-air battery according to claim 2, wherein the plurality of nanostructures of the air electrode are a nanosheet constituted of at least one of carbon, iron oxide, manganese oxide, zinc oxide, molybdenum oxide, or molybdenum sulfide, or are nanofibers constituted of at least one of carbon, iron oxide, manganese oxide, zinc oxide, molybdenum oxide, molybdenum sulfide, or cellulose.

10. The metal-air battery according to claim 2, wherein the anode is constituted of one or more of magnesium, aluminum, calcium, iron, or zinc.

11. The metal-air battery according to claim 3, wherein the anode is constituted of one or more of magnesium, aluminum, calcium, iron, or zinc.

12. The metal-air battery according to claim 2, wherein the air electrode supports a catalyst constituted of at least one metal of iron, manganese, zinc, copper, or molybdenum, or an oxide of at least one metal of calcium, iron, manganese, zinc, copper, or molybdenum.

13. The metal-air battery according to claim 3, wherein the air electrode supports a catalyst constituted of at least one metal of iron, manganese, zinc, copper, or molybdenum, or an oxide of at least one metal of calcium, iron, manganese, zinc, copper, or molybdenum.

14. The metal-air battery according to claim 4, wherein the air electrode supports a catalyst constituted of at least one metal of iron, manganese, zinc, copper, or molybdenum, or an oxide of at least one metal of calcium, iron, manganese, zinc, copper, or molybdenum.

15. A method for manufacturing an air electrode of the metal-air battery according to claim 2, the method comprising:

a freezing step of freezing a sol or gel in which the plurality of nanostructures are dispersed, to obtain a frozen substance; and a drying step of drying the frozen substance in a vacuum, to obtain the co-continuous substance.

16. A method for manufacturing an air electrode of the metal-air battery according to claim 3, the method comprising:

a freezing step of freezing a sol or gel in which the plurality of nanostructures are dispersed, to obtain a frozen substance; and a drying step of drying the frozen substance in a vacuum, to obtain the co-continuous substance.

17. A method for manufacturing an air electrode of the metal-air battery according to claim 4, the method comprising:

a freezing step of freezing a sol or gel in which the plurality of nanostructures are dispersed, to obtain a frozen substance; and a drying step of drying the frozen substance in a vacuum, to obtain the co-continuous substance.

18. A method for manufacturing an air electrode of the metal-air battery according to claim 5, the method comprising:

a freezing step of freezing a sol or gel in which the plurality of nanostructures are dispersed, to obtain a frozen substance; and a drying step of drying the frozen substance in a vacuum, to obtain the co-continuous substance.

19. A method for manufacturing an air electrode of the metal-air battery according to claim 2, the method comprising:

a gel production step of allowing bacteria to produce a gel in which nanofibers constituted of cellulose are dispersed;

a freezing step of freezing the gel;

a drying step of drying the gel as a frozen substance; and a carbonization step of heating the co-continuous substance which has been obtained by the drying in a gaseous atmosphere in which cellulose does not combust, to carbonize the co-continuous substance.

20. A method for manufacturing an air electrode of the metal-air battery according to claim 3, the method comprising:

a gel production step of allowing bacteria to produce a gel in which nanofibers constituted of cellulose are dispersed;

a freezing step of freezing the gel;

a drying step of drying the gel as a frozen substance; and a carbonization step of heating the co-continuous substance which has been obtained by the drying in a gaseous atmosphere in which cellulose does not combust, to carbonize the co-continuous substance.

* * * * *